(12) United States Patent
Lucke

(10) Patent No.: US 7,219,055 B2
(45) Date of Patent: May 15, 2007

(54) SPEECH RECOGNITION APPARATUS AND METHOD ADAPTING BEST TRANSFORMATION FUNCTION TO TRANSFORM ONE OF THE INPUT SPEECH AND ACOUSTIC MODEL

(75) Inventor: Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 10/344,031

(22) PCT Filed: Jun. 7, 2002

(86) PCT No.: PCT/JP02/05647
§ 371 (c)(1),
(2), (4) Date: Oct. 20, 2003

(87) PCT Pub. No.: WO02/101719
PCT Pub. Date: Dec. 19, 2002

(65) Prior Publication Data
US 2004/0059576 A1 Mar. 25, 2004

(30) Foreign Application Priority Data
Jun. 8, 2001 (JP) ............................. 2001-174633

(51) Int. Cl.
G10L 15/00 (2006.01)
(52) U.S. Cl. ..................................... 704/234; 704/203
(58) Field of Classification Search ................ 704/203, 704/233, 234
See application file for complete search history.

(56) References Cited
U.S. PATENT DOCUMENTS
6,151,573 A * 11/2000 Gong ....................... 704/256.2

6,223,159 B1 4/2001 Ishii
6,915,259 B2 * 7/2005 Rigazio et al. ............. 704/244
7,072,834 B2 * 7/2006 Zhou .......................... 704/244
2003/0115055 A1 * 6/2003 Gong ......................... 704/233
2006/0009972 A1 * 1/2006 Yuk et al. ................... 704/234

FOREIGN PATENT DOCUMENTS
JP 11-242494 9/1999
JP 2001-255886 9/2001

OTHER PUBLICATIONS
Leggetter C J et al: "Flexible Speaker Adaptation for Large Vocabulary Speech Recognition" 4th European Conference on Speech Communication and Technology. Eurospeech '95. Madrid, Spain, Sep. 18-21, 1995, European Conference on Speech Communication and Technology. (Eurospeech), Madrid: Graficas Brens, ES, vol. vol. 2 Conf. 4, Sep. 18, 1995, pp. 1155-1158, XP000854906.

(Continued)

Primary Examiner—Abul K. Azad
(74) Attorney, Agent, or Firm—Frommer Lawrence & Haug LLP; William S. Frommer; Thomas F. Presson

(57) ABSTRACT

The present invention relates to a speech recognition apparatus for recognizing speeches of a plurality of users with high accuracy. An adapting unit 12 detects a best transformation function for adapting an input speech to an acoustic model from at least one transformation function based on the transformation results which are obtained by transforming the input speech by at least one transformation function stored in a storing unit 13, and allocates the input speech to the best transformation function. Further, the adapting unit 12 updates the transformation function to which the new input speech is allocated by all the input speeches allocated to the transformation function. A selecting unit 14 selects the transformation function used for transforming the input speech from at least one transformation function stored in the storing unit 13. A transforming unit 5 transforms the input speech by the selected transformation function. A matching unit 6 performs matching processing in which the speech obtained by transforming the input speech matches the acoustic model. The present invention can be applied to speech recognition apparatuses.

22 Claims, 9 Drawing Sheets

OTHER PUBLICATIONS

Gales M J F: "The generation and use of regression class trees for MLLR adaptation" Cambridge University Engineering Department, Aug. 1996, XP002183889.

Leggetter C J et al: "Maximum likelihood linear regression for speaker adaptation of continuous density hidden Markov models" Computer Speech and Language, Elsevier, London, GB, vol. 9, No. 2, Apr. 1995, pp. 171-185, XP004418824 ISSN: 0085-2308.

Gales M J F: "Maximum likelihood linear transformations for HMM-based speech recognition" Computer Speech and Language, Elsevier, London, GB, vol. 12, No. 2, Apr. 1998, pp. 75-98, XP004418764 ISSN: 0885-2308.

Matsui, Furui, "Onsei Ninshiki no tame no N-best ni Motozuku Washa Tekioka", The Acoustical Society of Japan (ASJ) Heisei 8 Nendo Shuki Kenkyu Happyokai Koen Ronbunshu, Sep. 25, 1996, 3-3-16, pp. 117-118.

Kosaka, Matsunaga, Sagayama, "Ki Kozo Washa Clustering o Mochiita Washa Tekio", The Acoustical Society of Japan (ASJ) Heisei 5 Nendo Shuki Kenkyu Happyokai Koen Ronbunshu, Oct. 5, 1993, 2-7-14, pp. 97 to 98.

* cited by examiner

SPEECH RECOGNITION APPARATUS AND METHOD ADAPTING BEST TRANSFORMATION FUNCTION TO TRANSFORM ONE OF THE INPUT SPEECH AND ACOUSTIC MODEL

TECHNICAL FIELD

The present invention relates to a speech recognition apparatus and a speech recognition method. More particularly, the present invention relates to a speech recognition apparatus and a speech recognition method in which a speech is recognized with high accuracy without user's recognition of the adaptation to models upon using the apparatus by a plurality of users or under a plurality of environments.

BACKGROUND ART

In general, a speech recognition apparatus recognizes an input speech by the following processing (speech recognition processing).

That is, the speech recognition apparatus acoustically analyzes the input speech, thereby extracting a predetermined-dimensional characteristic vector indicating the amount of characteristics of the input speech. Fourier transform and the like are used as a method for analyzing the speech.

Then, the characteristic vector is subjected to matching processing with an acoustic model. A word string (words) corresponding to a series of acoustic models matching to the series of characteristic vector is obtained as the result of recognizing speech.

In the matching processing using, for example, a continuous HMM (Hidden Markov Model) method, the acoustic model is HMM using a probability (density) function such as at least one Gaussian probability distribution defined by characteristic vector space. In the matching processing, a likelihood (score) for observing the series of characteristic vector is calculated from the series of acoustic models as a plurality of candidates of the speech recognizing results (hereinafter, appropriately referred to as a theory) by using the Gaussian probability distribution forming the acoustic model, and the final speech recognizing result is determined from a plurality of theories based on the score. In other words, the theory in which the score for the series of characteristic vector is estimated as the highest one is selected as the acoustic model which best matches the input speech from the plurality of theories, and the word string corresponding to the series of the acoustic model forming the theory is outputted as the result of recognizing the speech.

In recent years, various speech recognition apparatuses are proposed, and they are classified into three types of a speech recognition apparatus for specific speakers, a speech recognition apparatus for unspecific speakers, and a model-adaptive speech recognition apparatus.

The speech recognition apparatus for specific speakers uses the acoustic model which is learnt by using the speeches of the specific speaker and, therefore, the result of recognizing the speech for specific speaker is obtained with high accuracy (low error-ratio). However, in the speech recognition apparatus for specific speakers, the accuracy for recognizing the speech of a speaker other than the specific speakers generally deteriorates.

The speech recognition apparatus for unspecific speakers uses the acoustic models which are learnt by the speeches of a large number of arbitrary speakers. Therefore, the results of recognizing the speeches of the arbitrary speakers are obtained with relatively high accuracy. However, in the speech recognition apparatus for unspecific speakers, a specific speaker is picked up and then the accuracy for recognizing the speech of the picked-up speaker is not so higher than the accuracy for recognizing the speech of the speech recognition apparatus for specific speaker.

The model-adaptive speech recognition apparatus first has the same performance as that of the speech recognition apparatus for unspecific speakers. However, during using the apparatus by the specific user (speaker), the adaptation to the acoustic model is performed based on the specific user's speech and the accuracy for recognizing speech of the specific user is improved.

That is, the model-adaptive speech recognition apparatus first recognizes the speech by using the acoustic model similar to that used by the speech recognition apparatus for unspecific speakers. In this case, the mismatching is analyzed between the input speech of the user and the acoustic model, and a transformation matrix for transforming the acoustic model into a model matching (applied to) the input speech is obtained. Thereafter, the speech is recognized by using the acoustic model obtained by transforming the acoustic model by using the transformation matrix, namely, the acoustic model after the adaptation to the acoustic model. The model-adaptive speech recognition apparatus performs the above-mentioned adaptation to the acoustic model as training operation before regularly using the apparatus by the user. Thus, the acoustic model is transformed into that matching the user's speech and the accuracy for recognizing the speech of the specific user is improved.

As mentioned above, in the model-adaptive speech recognition apparatus, the acoustic model is transformed into the acoustic model suitable to recognize the input speech. Consequently, attention is paid to the user (speaker) and then the speech recognition apparatus matches the user. Further, attention is paid to the environment of the speech recognition apparatus and then the speech recognition apparatus becomes adaptive to the environment.

In other words, the environment of the speech recognition apparatus includes noise at the place and the distortion of channels until the user's speech is inputted to the speech recognition apparatus. When the model-adaptive speech recognition apparatus is used under a predetermined environment, the acoustic model is transformed adaptively to the sound under the predetermined environment. In this view, the model-adaptive speech recognition apparatus is adaptive to the environment thereof. The distortions of the channels are caused depending on characteristics of a microphone for transforming the speech into an electrical signal, characteristics of a transfer line in which a band of a telephone line or the like is limited upon transferring the input speech of the speech recognition apparatus.

Upon using the HMM as the acoustic model, the adaptation to the acoustic model is performed by linearly converting an average vector for defining the Gaussian probability distribution forming the HMM by using the above-mentioned transformation matrix. An advantage equivalent to the adaptation to the model for transforming the acoustic model is obtained by linearly transforming the characteristic vector using the transformation matrix and by calculating the score using the characteristic vector after transform and the acoustic model. Therefore, the adaptation to the model means both the transformation of the acoustic model using the transformation matrix and the transformation of the characteristic vector. That is, the characteristic vector obtained by the user's speech may be made adaptive to the acoustic model, or the characteristic vector obtained by the user's speech may be made adaptive to the acoustic model.

The adaptation to the model is performed so as to improve (increasing) the likelihood of the characteristic vector of any target speech which is observed from the acoustic model, that is, the score of the characteristic vector which is calculated by the Gaussian probability distribution forming the HMM as the acoustic model corresponding to the target speech (the acoustic model indicating the phoneme of the target speech, etc.). Therefore, consider the adaptation to the model for transforming the characteristic vector, ideally, the characteristic vector is transformed by the transformation matrix, thus to map the characteristic vector to the average vector for defining the Gaussian probability distribution forming the acoustic model.

Then, in the adaptation to the acoustic model, in order to make the score of the characteristic vector of the target speech, which is calculated from the acoustic model corresponding to the target speech, larger than the score calculated from another acoustic model, the transformation matrix is obtained for executing the linear transformation in which the characteristic vector of the target speech matches the average vector for defining the Gaussian probability distribution forming the acoustic model corresponding to the target speech. The transformation matrix can be calculated periodically or aperiodically. Upon recognizing the speech, the matching processing is performed by using the characteristic vector (or the acoustic model) obtained by the transformation matrix.

The transformation matrix for adaptation to the acoustic model of one specific speaker is obtained by using a plurality of series of characteristic vector obtained from a plurality of speeches of the specific speaker. Therefore, a matrix for matching each of the plurality of characteristic vectors with the corresponding average vector must be obtained as the transformation matrix. As methods for obtaining the transformation matrix for mapping the plurality of characteristics vector to the corresponding average vectors, one method using the linear regression (least-squares method) is used. The transformation matrix obtained by the linear regression minimizes the characteristic vector obtained from the speech of the specific speaker to be mapped to a vector by which a statistic error from the corresponding average vector (here, the total of the squared errors). Therefore, generally, the transformation matrix does not enable any desired characteristic vector obtained from the speech of the specific speaker to completely match the corresponding average vector.

The methods for the adaptation to the model include not only the above-mentioned method but also other methods varied in details. According to any of the methods, similarly to the above-mentioned method, the characteristic vector of the target speech or the acoustic model corresponding to the target speech is basically transformed based on the acoustic model so that the likelihood for observing the characteristic vector becomes maximum.

In the model-adaptive speech recognition apparatus, the adaptation to the model of the speech of one specific user or the adaptation to the model under the specific environment are performed many times. Then, the accuracy for recognizing the speech of the specific user or the speech under the specific environment is improved and, on the other hand, the accuracy for recognizing the speech of other users or the speech under other environments deteriorates. As a result, the model-adaptive speech recognition apparatus has the same performance as that of the speech recognition apparatus for specific speaker.

After the model-adaptive speech recognition apparatus is adaptive to the specific user or the specific environment as mentioned above, the speech recognition apparatus is used by other users or is used under other environments, thereby enabling the speech recognition apparatus to adapt to other users or other environments.

However, just after the use of the apparatus starts by other users or under other environments, the acoustic model of the speech recognition apparatus is still adaptive to the first user or the first environment. Thus, the accuracy for recognizing the speech extremely deteriorates until the acoustic model becomes adaptive to other users or other environments.

Further, in some cases, the acoustic model adaptive to the first user or the user environment cannot completely adapt to other users or other environments. The acoustic model adaptive to the first user or the first environment must return (reset) to the initial acoustic model and then must adapt to other users or other environments.

In the above-mentioned case, the following speech recognition apparatus exists. That is, a plurality of sets of the acoustic models are prepared and the sets of the acoustic models varied depending on the users are made adaptive to the users. The speech recognition apparatus recognizes the speech of the plurality of users by using the acoustic model adaptive to the users and therefore the accuracy for recognizing the speech is obtained for all the users, similarly to the speech recognition apparatus for specific speakers.

However, the above-mentioned speech recognition apparatus recognizes the speech by using the acoustic model adaptive to the user of the speech and therefore it must be informed which user speaks. Thus, it is troublesome that the user must input information for specifying him by operating a button or the like before starting to use the apparatus.

DISCLOSURE OF INVENTION

The present invention is devised under the above-described situation. It is an object of the present invention to recognize the speech with high accuracy without user's recognition of the adaptation to model when a speech recognition apparatus is used by a plurality of users or under a plurality of environments.

According to the present invention, there is provided a speech recognition apparatus comprising: transformation function storing means for storing at least one transformation function for transforming one of an input speech and an acoustic model used for recognizing the speech when transforming one of the input speech and the acoustic model and adapting the transformed one to the other; allocating means for detecting the best transformation function to adapt the one of the input speech and the acoustic model corresponding to the input speech to the other from at least one transformation function stored in the transformation matrix storing means based on the transforming result of transforming the one of the input speech and the acoustic model by at least one transform function stored in the transform function storing means, and for allocating the input speech to the best transformation function; speech storing means for storing the input speech to which the transformation function is allocated; transformation function updating means for updating the transformation function to which a new input speech is allocated by the allocating means from at least one transformation function stored in the transform function storing means by using all the input speeches allocated to the transformation function; transformation function selecting means for selecting the transformation function used for transforming one of the input speech and the acoustic model from at least one transformation function stored in the transform function storing means; transforming means for transforming one of the input speech and the acoustic model by the transformation function selected by the transformation function selecting means; and matching means for performing matching processing in which the one of the input speech and the acoustic model transformed by the transformation function matches the other and for outputting the result of recognizing the input speech based on the matching processing result.

According to the present invention, there is provided a speech recognition method comprising: an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function; a speech storing step of storing the input speech to which the transformation function is allocated; a transformation function updating step of updating the transformation function to which a new input speech is allocated in the allocating step from at least the one transformation function by using all the input speeches allocated to the transformation function; a transformation function selecting step of selecting the transformation function used for transforming one of the input speech and the acoustic model from at least the one transformation function; a transforming step of transforming one of the input speech and the acoustic model by the transformation function selected in the transformation function selecting step; and a matching step of performing matching processing in which the one of the input speech and the acoustic model transformed by the transformation function matches the other and for outputting the result of recognizing the input speech based on the matching processing result.

According to the present invention, there is provided a program comprising: an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function; a speech storing step of storing the input speech to which the transformation function is allocated; a transformation function updating step of updating the transformation function to which a new input speech is allocated in the allocating step from at least the one transformation function by using all the input speeches allocated to the transformation function; a transformation function selecting step of selecting the transformation function used for transforming one of the input speech and the acoustic model from at least the one transformation function; a transforming step of transforming one of the input speech and the acoustic model by the transformation function selected in the transformation function selecting step; and a matching step of performing matching processing in which the one of the input speech and the acoustic model transformed by the transformation function matches the other and of outputting the result of recognizing the input speech based on the matching processing result.

According to the present invention, there is provided a recording medium for recording a program comprising: an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function; a speech storing step of storing the input speech to which the transformation function is allocated; a transformation function updating step of updating the transformation function to which a new input speech is allocated in the allocating step from at least the one transformation function by using all the input speeches allocated to the transformation function; a transformation function selecting step of selecting the transformation function used for transforming one of the input speech and the acoustic model from at least the one transformation function; a transforming step of transforming one of the input speech and the acoustic model by the transformation function selected in the transformation function selecting step; and a matching step of performing matching processing in which the one of the input speech and the acoustic model transformed by the transformation function matches the other and of outputting the result of recognizing the input speech based on the matching processing result.

According to the present invention, the best transformation function to adapt one of the input speech and the acoustic model corresponding to the input speech to the other is detected from at least one transformation function based on a transforming result of transforming the one of the input speech and the acoustic model from at least the one transformation function. The input speech is allocated to the best transformation function. The transformation function to which a new input speech is updated by using all the input speeches allocated to the transformation function. Further, the transformation function used for transforming one of the input speech and the acoustic model is selected from at least one transformation function. The selected transformation function transforms one of the input speech and the acoustic model. Matching processing is processed so that the transformed one of the input speech and the acoustic model matches the other. The result of recognizing the input speech is outputted based on the matching processing result.

BEST MODE FOR CARRYING OUT THE INVENTION

Figure 1:
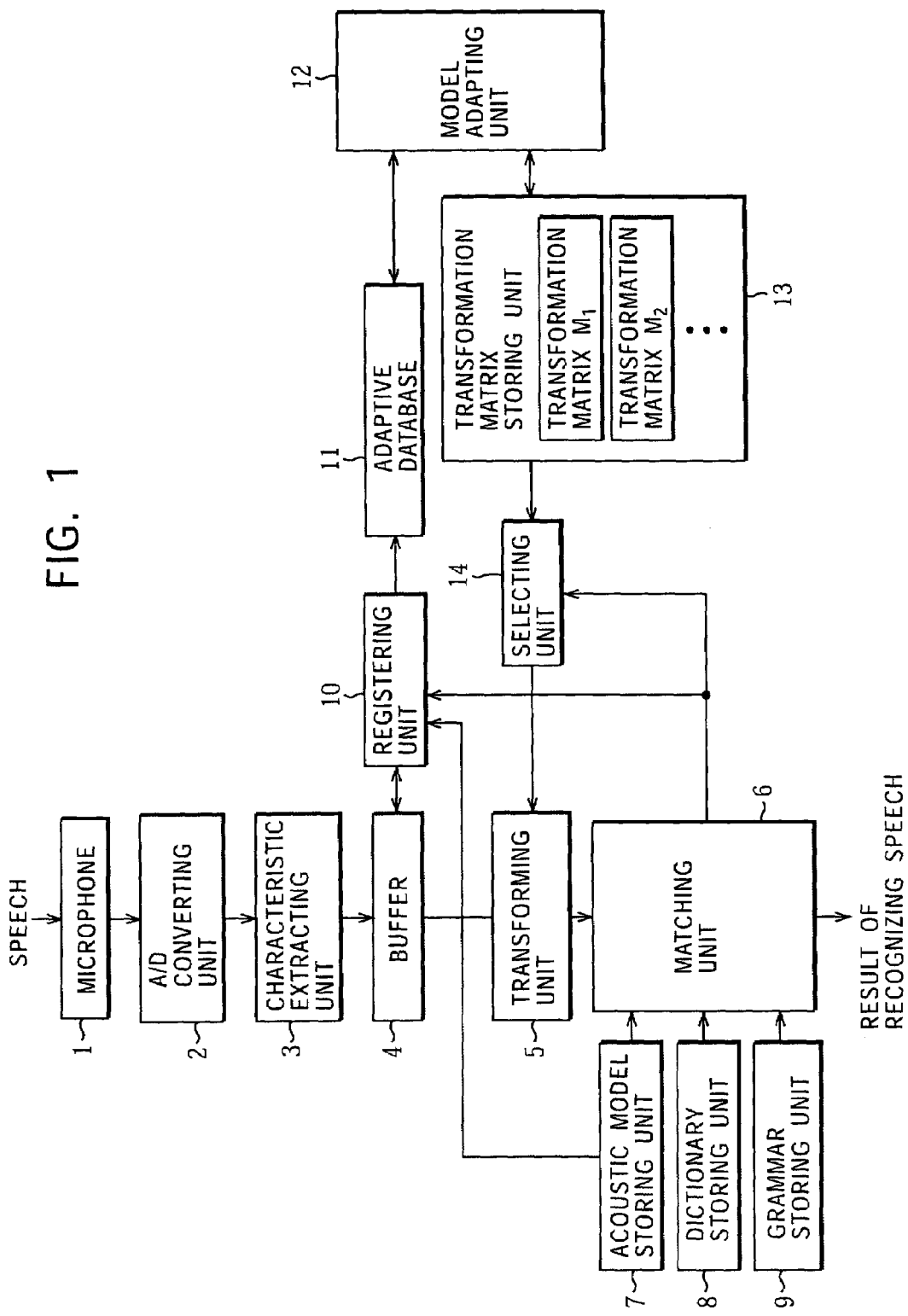
FIG. 1 is a block diagram showing an example of the structure of a speech recognition apparatus according to a first embodiment of the present invention.

FIG. 1 shows an example of the structure of a speech recognition apparatus according to a first embodiment of the present invention.

User's speech is inputted to a microphone 1, and the microphone 1 transforms the input speech into a speech signal as an electrical signal. The speech signal is supplied to an A/D (Analog/Digital) converting unit 2. The A/D converting unit 2 samples the speech signal as an analog signal from the microphone 1, quantizes the-speech signal, converts it into speech data as a digital signal. The speech data is supplied to a characteristic extracting unit 3.

The characteristic extracting unit 3 subjects the speech data from the A/D converting unit 2 to acoustic analysis processing every proper frame, thus to extract the characteristic vector as the amount of characteristics such as MFCC (Mel Frequency Cepstrum Coefficient). Further, the characteristic extracting unit 3 can extract the characteristic vectors such as spectrum, a linear predictive coefficient, a cepstrum coefficient, and pair of linear spectrums.

The characteristic vector obtained every frame by the characteristic extracting unit 3 is sequentially supplied and stored in a characteristic vector buffer 4. Therefore, in the characteristic vector buffer 4, a time series of characteristic vector every frame is stored.

The buffer 4 stores the time series of characteristic vector obtained from the start to the end of the speech (speech section).

A transforming unit 5 linearly transforms the characteristic vector stored in the buffer 4 by the transformation matrix supplied from a selecting unit 14, and supplies the characteristic vector after transformation (hereinafter, referred to as a transforming characteristic vector) to a matching unit 6 as the characteristic vector adaptive to the acoustic model stored in an acoustic model storing unit 7.

The matching unit 6 recognizes the speech inputted to the microphone 1 based on the continuous distribution HMM method or the like by referring to an acoustic model storing unit 7, a dictionary storing unit 8, and a grammar storing unit 9 by using the characteristic vector (transforming characteristic vector) supplied from the transforming unit 5 if necessary.

In other words, the acoustic model storing unit 7 stores the acoustic model indicating acoustic characteristics for each predetermined unit (PLL (Phonetic-Linguistic-Units)) such as individual phonemes and syllables for recognizing the speech in a speech language. Here, the speech is recognized based on the continuous distribution HMM method and therefore the acoustic model uses HMM (Hidden Markov Model) having the Gaussian distribution used for calculating the probability for observing a predetermined series of characteristic vector. The Gaussian distribution of the HMM is defined by an average vector and a conjugate distribution matrix. The HMM can be formed by using a probability density function except for the Gaussian distribution.

The dictionary storing unit 8 stores a word dictionary which describes information (phonology) on the speech.

The grammar storing unit 9 stores a grammar regulation (language model) which describes how to link (combine) the word registered in the word dictionary of the dictionary storing unit 8. Herein, the grammar regulation uses regulations based on a context-free grammar (CFG) and a statistic word linking probability (N-gram).

The matching unit 6 connects the acoustic models stored in the acoustic storing unit 7 by referring to the word dictionary in the dictionary storing unit 8, thereby forming the acoustic model of the word (word model). Further, the matching unit 6 connects some word models by referring to the grammar regulation stored in the grammar storing unit 9, and recognizes the speech inputted to the microphone 1 by the continuous distribution HMM method based on the time series of characteristic vectors using the above-connected word model. That is, the matching unit 6 calculates the score indicating the likelihood for observing the times series of characteristic vector supplied via the transforming unit 5, from the series of word models having the above-mentioned structure. The matching unit 6 detects the series of word model having the highest score, and outputs the word string corresponding to the series of the word model as a result of recognizing the speech.

Since the speech is recognized by the HMM method, the matching unit 6 accumulates the appearance probabilities of the characteristic vectors of the word string corresponding to the connected word model, outputs the word string having the highest score having an accumulated value, as the result of recognizing the speech.

In general, the score is calculated by totally estimating an acoustic score given by the acoustic model stored in the acoustic model storing unit 7 (hereinafter, appropriately referred to as an acoustic score) and a language score given by the grammar regulation stored in the grammar storing unit 9 (hereinafter, referred to a language score).

In other words, in the case of using the HMM method, the acoustic score is calculated based on the probability for observing the series of characteristic vectors outputted by the characteristic extracting unit 3 from the acoustic model forming the word model. In the case of using bigram, the language score is obtained based on the probability for linking a target word to a word just therebefore. The result of recognizing the speech is determined based on the final score obtained by totally estimating the acoustic score and the language score of the words (hereinafter, appropriately referred to as a final score).

Specifically, reference symbol wk denotes a k-th word in the word string having N words, reference symbol $A(w_k)$ denotes the acoustic score of the word $w_k$, and reference symbol $L(w_k)$ denotes the language score of the word $w_k$. Reference symbol S denotes the final score of the word string. In this case, the final score S is calculated by the following formula.

$$S = \Sigma(A(w_k) + L(w_k)) \quad (1)$$

Incidentally, reference symbol Σ denotes summation when the number k changes from 1 to N. Reference symbol $C_k$ denotes a weight of the language score $L(w_k)$ of the word $w_k$.

In the matching unit 6, the matching processing is performed so that the number N having the final score expressed by the above formula (1) and a word string $w_1$, $w_2, \ldots, w_N$ is obtained as the result of the speech. The word string $w_1, w_2, \ldots, w_N$ is outputted as the result of recognizing speech.

As a result of the above-mentioned matching processing, in the speech recognition apparatus shown in FIG. 1, when the user says "New York ni ikitai desu", the acoustic scores and the language scores are given to words of "New York", "ni", "ikitai", "desu". When the final score obtained by totally estimating the acoustic scores and the language scores is the largest, the word string of "New York", "ni", "ikitai" and "desu" is outputted as the result of recognizing the speech.

In the above-mentioned case, it is assumed that four words of "New York", "ni", "ikitai", and "desu" are registered in the word dictionary in the dictionary storing unit 8. The number of four-word permutations using the above four words is $4^4$ Therefore, simply, the matching unit 6 estimates the $4^4$ word strings, and determines the word string best matching the user's speech (the largest final score) from the above permutations. If the number of words registered in the word dictionary increases, the number of permutations of the number of words is equal to the square of the number of words. Therefore, the number of word strings as an estimation target is numerous.

Further, the number of words included in the speech is generally unknown and therefore not only the word string having the permutations of the four words but also the word strings containing one word, two words, . . . must be estimated. Therefore, the number of estimated word strings is further enormous. It is extremely important in views of the amount of calculation and the memory capacity to effectively determine the word string having the highest likelihood as the result of recognizing the speech from the numerous word strings.

Methods for improving the efficiency of the amount of calculation and the memory capacity include a method for acoustic pruning by which the score calculation is stopped based on the acoustic score obtained in the midway of processing for obtaining the acoustic score, a language pruning method for narrowing the word as the target of the score calculation, and the like.

These pruning methods are called a beam search method. In the beam search method, a predetermined threshold is used for narrowing (pruning) the word and it is called a beam width.

Herein, properly, the acoustic score and the language score are named in a lump scores.

In the beam search method, a series of a word is set as a theme of a candidate of the result of recognizing the speech, a new theme is generated by newly connecting the word to the series of the word (candidate of the result of recognizing the speech) as the theme, and the score of the word series as the generated theme is calculated by using the characteristic vector. Further, the theme having the relatively low score is deleted and the similar processing is repeated for the remaining themes.

When the calculation of scores ends from the head to the last in the series of the characteristic vector obtained from the speech as the target of speech recognition (in the speech segment), the series of the word as the theme having the highest score is set as the result of recognizing the speech among the remaining themes at this point.

A registering unit 10 allows the series of characteristic vector of each speech (each speech section) to correspond to the series of the average vector for defining the Gaussian distribution of the acoustic model (here, HMM as mentioned above) of the series corresponding to the speech, and supplies it to an adaptive database 11.

The series of characteristic vector supplied to the adaptive database 11 by the registering unit 10 and the series of the average vector corresponding thereto are used for updating the transformation matrix for making the characteristic vector outputted by the characteristic extracting unit 3 adaptive to the acoustic model stored in the acoustic model storing unit 7. Hereinbelow, a set of the series of characteristic vector supplied to the adaptive database 11 by the registering unit 10 and the series of the average vector corresponding thereto is appropriately referred to as adaptive data.

The series of the average vector of the above adaptive data is the series of characteristic vector having the highest likelihood (probability) which is observed from the series of corresponding acoustic model. Therefore, ideally, the transformation matrix for best adaptation to the model is the transformation matrix which transforms the series of characteristic vector of the adaptive data to the series of the average vector corresponding to the characteristic vector.

The formation of the adaptive data needs the characteristic vector of the speech and the series of acoustic model corresponding to the speech. The characteristic vector of the speech forming the adaptive data is obtained by processing the user's speech inputted to the microphone 1 by the characteristic extracting unit 3. It is important to how to recognize the series of acoustic model corresponding to the speech inputted to the microphone 1. The acoustic model is recognized by two following methods.

That is, according to a first method, in the speech recognition apparatus, a speech of a predetermined word is requested to the user. In this case, if the user speaks the predetermined word in response to the request, the series of acoustic models corresponding to the speech is recognized based on the predetermined word which is requested by the user.

According to a second method, in the speech recognition apparatus, the transforming unit 5 transforms the characteristic vector obtained from the user's speech by the transformation matrix stored in a transformation matrix storing unit 13, as will be described later. Then, the matching unit 6 performs the matching processing by using the above-obtained transforming characteristic vector. In this case, among the results of recognizing the speech obtained from the transforming characteristic vector, the series of acoustic model having the highest score as the proper result of recognizing the speech is recognized as the series of acoustic model corresponding to the user's speech.

Incidentally, according to the second method, the registering unit 10 recognizes the score by monitoring an inner status of the matching unit 6, and recognizes the series of acoustic model corresponding to the speech (having the highest score) of the series of characteristic vector of the speech stored in the buffer 4.

According to the first or second method, the registering unit 10 must recognize the average vector of the HMM as the acoustic model (the average vector for defining the Gaussian distribution used for calculating the probability for observing the characteristic vector from the status of the HMM). However, the registering unit 10 recognizes the average vector by referring to the acoustic model storing unit 7.

The adaptive database 11 stores the adaptive data supplied from the registering unit 10 and allocation information indicating the adaptive data is allocated to which transformation matrix stored in the transformation matrix storing unit 13. The allocation information is supplied to the adaptive database 11 from the model adapting unit 12.

The model adapting unit 12 updates, generates, and deletes the transformation matrix used for the adaptation to the model in which the characteristic vector of the speech is adaptive to the acoustic model stored in the acoustic model storing unit 7, by using the adaptive data stored in the adaptive database 11.

Further, when new adaptive data is stored in the adaptive database 11, the model adapting unit 12 recognizes that the adaptive data is allocated to which transformation matrix stored in the transformation matrix storing unit 13, and allocates the adaptive data to the transformation matrix.

In other words, the model adapting unit 12 recognizes that the newly stored adaptive data is allocated to which transformation matrix stored in the transformation matrix storing unit 13, and generates the allocation information indicating the allocation. Furthermore, the model adapting unit 12 supplies the allocation information to the adaptive database 11, and stores the allocation information corresponding to the adaptive data.

Thus, in the speech recognition apparatus shown in FIG. 1 (similarly, in a speech recognition apparatus shown in FIG. 8 which will be described later), all the adaptive data stored in the adaptive database 11 is allocated to any of the transformation matrixes stored in the transformation matrix storing unit 13. The allocation causes the adaptive data to be classified (be subset) to some classes (classes specified by the transformation matrixes).

The transformation matrix storing unit 13 stores at least one transformation matrix. In an initial status, the transformation matrix storing unit 13 stores only one transformation matrix. Herein, an identical matrix (unit matrix) or the like is used as one transformation matrix stored as the initial state, similarly to the conventional model-adaptive speech recognition apparatus.

The selecting unit 14 monitors the inner status of the matching unit 6, selects a transform function used for transforming the characteristic vector stored in the buffer 4 from at least one transform function stored in the transformation matrix storing unit 13, and supplies the selected transform function to the transforming unit 5.

Figure 2:
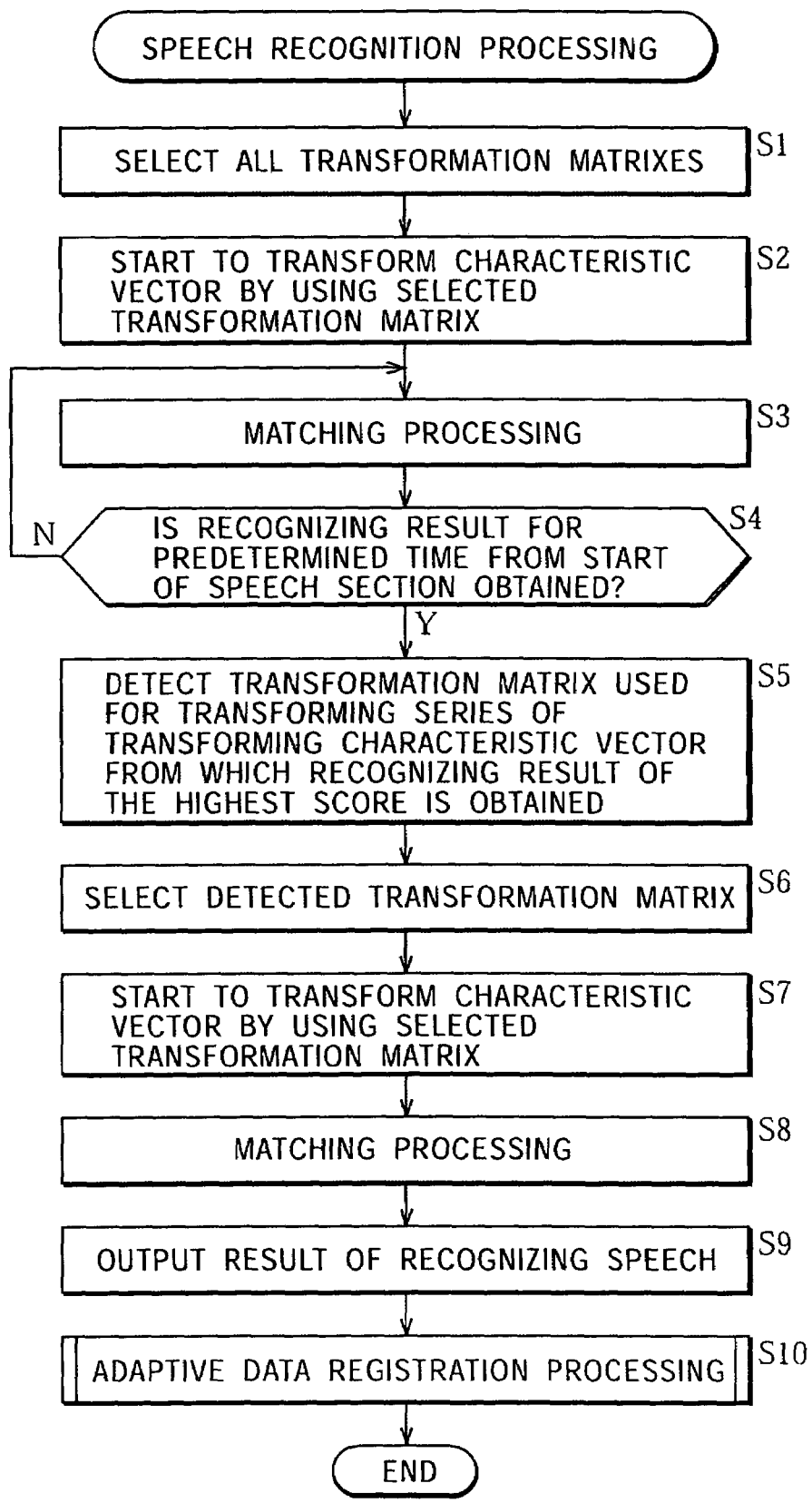
FIG. 2 is a flowchart for explaining speech recognition processing.

Next, a description is given of the speech recognition processing of the speech recognition apparatus shown in FIG. 1 with reference to a flowchart shown in FIG. 2.

The user's speech inputted to the microphone 1 is supplied to the characteristic extracting unit 3 as the digital speech data via the A/D converting unit 2. The characteristic extracting unit 3 acoustically analyzes the supplied speech data every predetermined frame, and extracts the characteristic vector. The characteristic vector obtained every frame by the characteristic extracting unit 3 is sequentially supplied and stored in the buffer 4. The extraction of the characteristic vector by the characteristic extracting unit 3 and the storage of the characteristic vector by the buffer 4 are continued until one speech of the user (speech section) ends.

The detection of the speech section is performed by, e.g., a well-known method or the like.

As mentioned above, the storage of the characteristic vector in the buffer 4 is started. In step S1, the selecting unit 14 selects all the transformation matrixes stored in the transformation matrix storing unit 13, supplies the selected transformation matrixes to the transforming unit 5, and the processing routine advances to step S2. Herein, the transformation matrix selected by the selecting unit 14 is referred to as a selected transformation matrix hereinbelow.

In step S2, the transforming unit 5 starts to read the time series of characteristic vector from the buffer 4, to transform the characteristic vector read from the buffer 4 by using the selected transformation matrix supplied from the selecting unit 14, and to supply the transforming characteristic vector obtained by the transform to the matching unit 6.

That is, in this case, all the transformation matrixes stored in the transformation matrix storing unit 13 become the selected transformation matrix. Therefore, the transforming unit 5 transforms the characteristic vector stored in the buffer 4 by the transformation matrix, and supplies the transformed series of the transforming characteristic vector to the matching unit 6.

Thus, in step S2, the transforming unit 5 starts to supply the series of characteristic vector transformed by at least one transformation matrix stored in the transformation matrix storing unit 13 to the matching unit 6.

Thereafter, in step S3, the matching unit 6 performs matching processing for calculating the score based on the continuous distribution HMM method or the like by pruning the theme based on the beam search by referring to the acoustic model storing unit 7, the dictionary storing unit 8, and the grammar storing unit 9 using the supplied series of characteristic vector if necessary.

In other words, the matching unit 6 performs the matching processing of the series of characteristic vector transformed by at least one transformation matrix stored in the transformation matrix storing unit 13.

In step S4, the matching unit 6 determines whether or not the themes corresponding to a predetermined time from the start time of the speech section for the series of characteristic vectors transformed by at least one transformation matrix stored in the transformation matrix storing unit 13 are obtained.

In step S4, if it is determined that the themes corresponding to the predetermined time from the start time of the speech section are not obtained yet, the processing routine returns to step S3 whereupon the matching unit 6 continues the matching processing using the series of characteristic vector supplied from the transforming unit 5.

In step S4, if it is determined that the themes corresponding to the predetermined time from the start time of the speech section are obtained, that is, if the matching unit 6 obtains the themes corresponding to the predetermined time from the start time of the speech section for the characteristic vectors transformed by at least one transformation matrix stored in the transformation matrix storing unit 13, the processing routine advances to step S5 whereupon the selecting unit 14 selects the theme having the highest score from the themes corresponding to the predetermined time obtained every characteristic vector transformed by at least one transformation matrix stored in the transformation matrix storing unit 13. Further, in step S5, the selecting unit 14 detects the transformation matrix used for transforming the series of characteristic vector from which the highest score is obtained, and the processing routine advances to step S6.

Herein, the above-obtained detected transformation matrix (hereinafter, appropriately referred to as a detected transformation matrix) supplies the highest score which is obtained from the acoustic model stored in the acoustic model storing unit 7 to (the characteristic vector of) the user's input speech. The detected transformation matrix adapts the user's speech best to the acoustic model. In other words, the detected transformation matrix is the best transformation matrix for the user's speech.

In step S6, the selecting unit 14 selects the detected transformation matrix (best transformation matrix) detected in step S5 from the transformation matrixes stored in the transformation matrix storing unit 13, and supplies the selected transformation matrix to the transforming unit 5, and the processing routine advances to step S7.

In step S7, the transforming unit 5 starts to transform the characteristic vector read from the buffer 4 by using the selected transformation matrix supplied from the selecting unit 14, and to supply the above-transformed transforming characteristic vector to the matching unit 6.

Namely, the series of characteristic vector transformed by the transformation matrix (hereinafter, appropriately referred to as a best transformation matrix) which adapts the user's input speech best to the acoustic model starts to be supplied to the matching unit 6.

Thereafter, in step S8, the matching unit 6 continues the matching processing by using the supplied series of characteristic vector. That is, the matching unit 6 continues the matching processing by using the series of characteristic vector which is transformed by the best transformation matrix for the input speeches from the transformation matrixes stored in the transformation matrix storing unit 13. Thus, the matching unit 6 calculates the score obtained by using the series of characteristic vector which is transformed by the best transformation matrix.

In this case, the matching unit 6 deletes the score and the theme obtained by the characteristic vector transformed by the transformation matrix other than the best transformation matrix, which is obtained from the looping processing in steps S3 and S4.

After ending the calculation of the score until the end time of the speech section, in step S9, the matching unit 6 detects the theme having the highest score from the remaining themes and outputs the detected theme as the result of recognizing the speech. Then, the processing routine advances to step S10.

In step S10, adaptive data registration processing is performed so that the new adaptive data is registered to the adaptive database 11, and the speech recognition processing ends.

Figure 3:
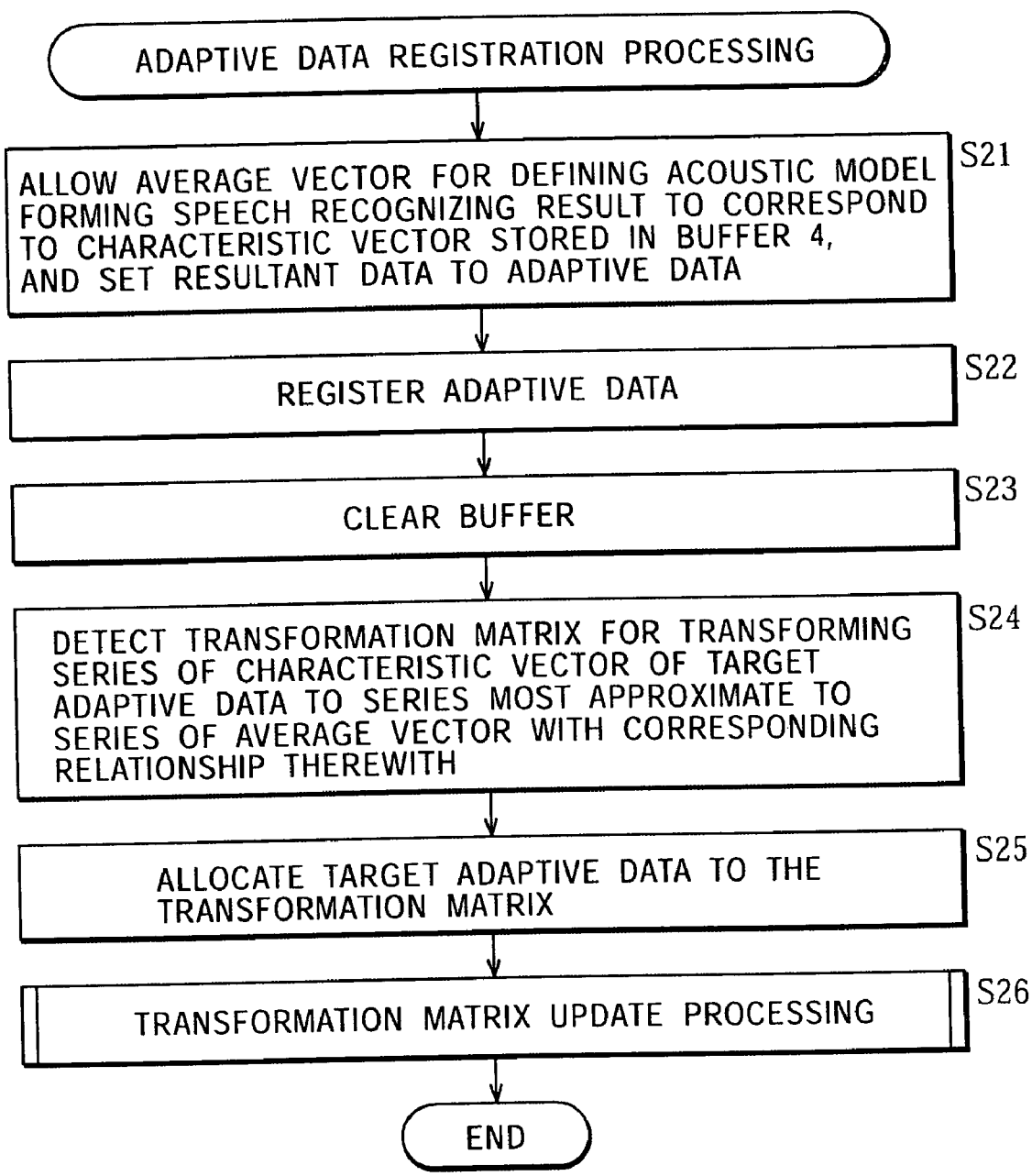
FIG. 3 is a flowchart for explaining adaptive data registration processing.

Next, a description is given of the best data registration processing in step S10 in FIG. 2 with reference to a flowchart shown in FIG. 3.

In the adaptive data registration processing, first, in step S21, the registering unit 10 refers to the inner status of the matching unit 6 and, thus, recognizes the series of acoustic model corresponding to the speech (series of acoustic model forming the result of recognizing the speech of the voice) about the series of the characteristic vector of the speech of one voice stored in the buffer 4. Further, in step S21, the registering unit 10 recognizes the average vector for defining the Gaussian distribution of the acoustic model of the series of the recognized acoustic model by referring to the acoustic model storing unit 7, and forms the adaptive data by allowing the series of the average vector corresponding to the series of the acoustic model to correspond to the series of the characteristic vector stored in the buffer 4. In step S22, the registering unit 10 supplies and stores the adaptive data to the adaptive database 11 and the processing routine advances to step S23.

In step S23, the registering unit 10 clears the buffer 4 by deleting the series of the characteristic vector of one voice stored in the buffer 4, and the processing routine advances to step S24.

In step S24, the model adapting unit 12 sets, as the target adaptive data, the new adaptive data stored in the adaptive database 11 in step S22. Then, the model adapting unit 12 detects, from the transformation matrixes stored in the transformation matrix storing unit 13, the transformation matrix (best transformation matrix) for transforming the series of the characteristic vector as the target adaptive data to the series of vector most approximate to the series of the average vector corresponding to the series of characteristic vector.

That is, the model adapting unit 12 transforms the series of characteristic vector as the target adaptive data by using one transformation matrix stored in the transformation matrix storing unit 13, thus to obtain the series of transforming characteristic vector. Further, the model adapting unit 21 obtains the total of distances between the transformation matrix vectors of the series of transforming characteristic vector and the corresponding average vectors of the series of the average vector as the target adaptive data, as an error between the transforming characteristic vector and the average vector. The model adapting unit 21 obtains the above-mentioned error between the transforming characteristic vector and the series of average vector for each of the transforming characteristic vector obtained from the transformation matrixes stored in the transformation matrix storing unit 13, and detects, as the best transformation matrix, the transformation matrix used for obtaining the transforming characteristic vector which generates the minimum error.

In step S25, the model adapting unit 12 allocates the target adaptive data to the best transformation matrix. That is, the model adapting unit 12 sets information indicating the best transformation matrix to the above-mentioned information, supplies the allocation information to the adaptive database 11, and stores the allocation information with a corresponding relationship with the target adaptive data.

After that, in step S26, the model adapting unit 12 performs the transformation matrix update processing for updating the transformation matrix stored in the transformation matrix storing unit 13 by using the adaptive data stored in the adaptive database 11, and then ends the adaptive data registration processing.

Figure 4:
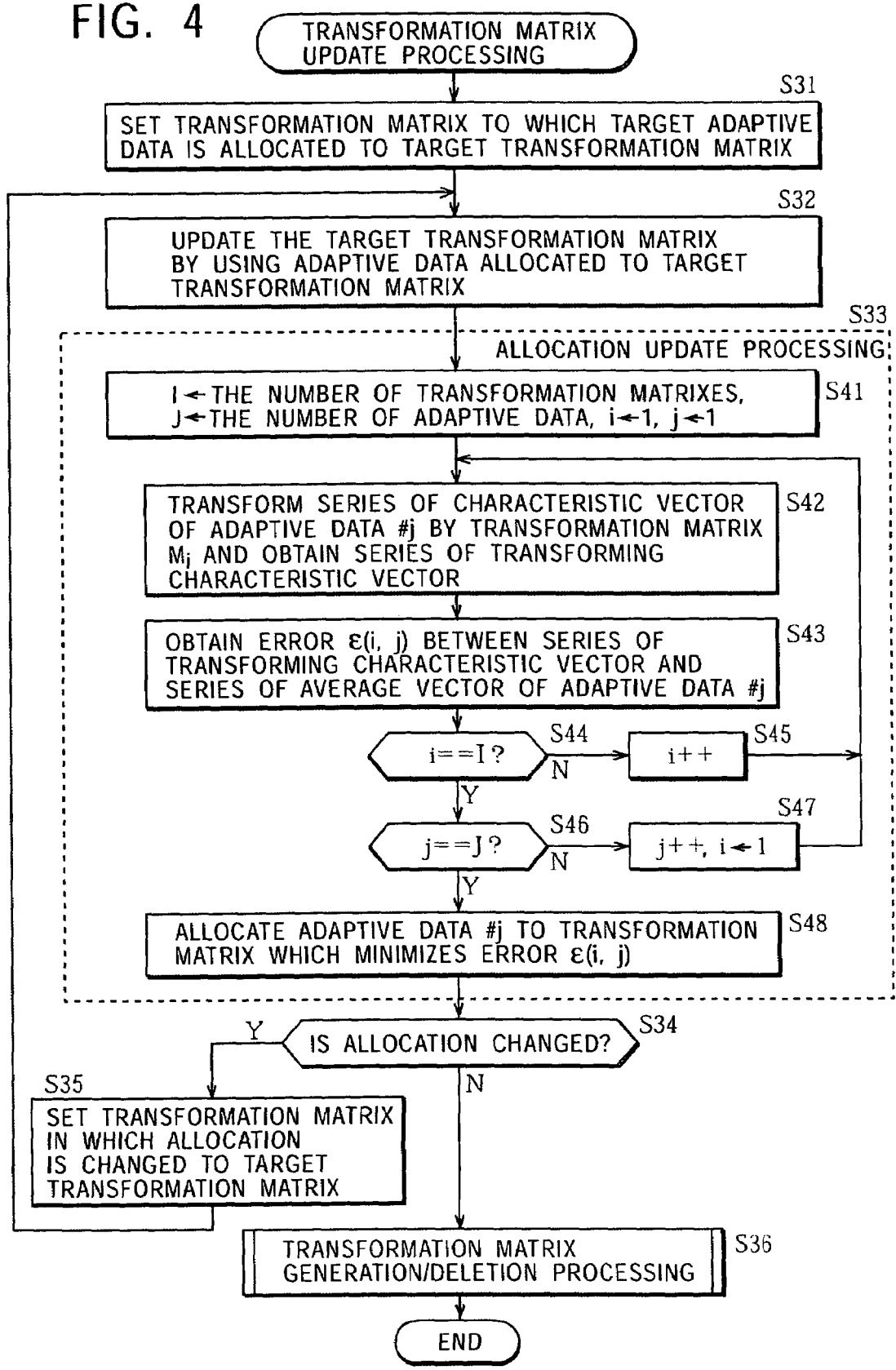
FIG. 4 is a flowchart for explaining transformation matrix update processing.

Next, a description is given of the transformation matrix update processing in step S26 in FIG. 3 with reference to a flowchart shown in FIG. 4.

In the transformation matrix update processing, first, in step S31, the model adapting unit 12 sets, as the target transformation matrix, the transformation matrix to which the target adaptive data is allocated, from the transformation matrixes stored in the transformation matrix storing unit 13. Then, the processing routine advances to step S32.

In step S32, the model adapting unit 12 updates the target transformation matrix by using all the adaptive data which is allocated to the target transformation matrix.

That is, the model adapting unit 12 obtains by using the least square method (linear regression), a matrix for linearly transforming the series of characteristic vector of the adaptive data allocated to the target transformation matrix, which gives a minimum error between the series of characteristic vector after linearly transforming and the average vector which corresponds to the series of characteristic vector. The model adapting unit 12 updates the target transformation matrix (replaces the matrix with the target transformation matrix), supplies the target transformation matrix after update to the transformation matrix storing unit 13, and stores the target transformation matrix after update to that before update in an overlapping status.

Basically, the method for updating the target transformation matrix in step S32 is similar to the adaptation to the model in the conventional model-adaptive speech recognition apparatus. However, unlike the conventional method for adaptation to the model using all the speeches inputted for the adaptation to the model, only the adaptive data allocated to the target transformation matrix is used in the method for updating the target transformation matrix in step S32. The conventional method for adaptation to the model has no concept in which the adaptive data is allocated to the transformation matrix.

In step S32, the adaptive data allocated to the target transformation matrix is recognized by referring to the allocation information stored in the adaptive database 11.

After updating the target transformation matrix in step S32, in step S33, allocation update processing is performed to update the allocation of the adaptive data of the transformation matrixes stored in the transformation matrix storing unit 13.

That is, in step S32, the target transformation matrix is updated. Therefore, the adaptive data allocated to the transformation matrix stored in the transformation matrix storing unit 13 includes not the currently allocated transformation matrix but the target transformation matrix which becomes the best transformation matrix. Further, the adaptive data allocated to the updated target transformation matrix includes not the target transformation matrix but another transformation matrix which becomes the best transformation matrix. Therefore, in the allocation update processing in step S33, it is checked whether or not the adaptive data stored in the adaptive database 11 includes the currently allocated transformation matrix which is the best transformation matrix. If NO in step S33, the adaptive data is allocated again to the best transformation matrix.

Specifically, the allocation update processing comprises processing in steps S41 to S48. First, in step S41, the model adapting unit 12 sets to variables I and J, the number of transformation matrixes stored in the transformation matrix storing unit 13 and the number of adaptive data stored in the adaptive database 11. Further, the model adapting unit 12 initializes both a variable i for counting the transformation matrix and a variable j for counting the adaptive data to 1.

Then, in step S42, the model adapting unit 12 transforms the series of characteristic vector of adaptive data #j as j-th adaptive data stored in the adaptive database 11 by a transformation matrix $M_i$ as an i-th transformation matrix stored in the transformation matrix storing unit 13, and the processing routine advances to step S43. In step S43, the model adapting unit 12 obtains an error $\epsilon(i, j)$ between the transforming characteristic vector obtained by transforming the adaptive data #j by the transformation matrix $M_i$ and the series of average vector of the adaptive data #j in the manner similar to that described in step S24 in FIG. 3.

In step S44, the model adapting unit 12 determines whether or not the variable i is equal to a total I of the transformation matrixes. If it is determined in step S44 that the variable i is not equal to the total I, the processing routine advances to step S45 whereupon the model adapting unit 12 increments the variable i by 1. Then, the processing routine returns to step S42 whereupon the similar processing repeats.

If it is determined in step S44 that the variable i is equal to the total I, the processing routine advances to step S46 whereupon the model adapting unit 12 determines whether or not the variable j is equal to a total J of the adaptive data. If it is determined in step S46 that the variable j is not equal to the total J, the processing routine advances to step S47 whereupon the model adapting unit 12 increments the variable j by 1 and the variable i is initialized to 1. Then, the processing routine returns to step S42 whereupon the similar processing returns.

If it is determined in step S46 that the variable j is equal to the total J, that is, when obtaining errors $\epsilon(i, j)$ (i=1, 2, . . . , I; j=1, 2, . . . , J) between the transforming characteristic vectors obtained by transforming all the adaptive data stored in the adaptive database 11 by the transformation matrixes stored in the transformation matrix storing unit 13 and the series of average vectors of the adaptive data, the processing routine advances to step S48 whereupon the model adapting unit 12 allocates the adaptive data #j to the transformation matrix $M_i$ which causes the error $\epsilon(i, j)$ to be minimum again. That is, the model adapting unit 12 stores (overwrites), as the allocation information, information indicating the transformation matrix $M_i$ which causes the error $\epsilon(i, j)$ to be minimum, to the adaptive data #j stored in the adaptive database 11, with a corresponding relationship therewith.

Herein, when the adaptive data #j is allocated to the transformation matrix $M_i$, appropriately, an error of the adaptive data indicates the error $\epsilon(i, j)$ between the series of average vector of the adaptive data #j and the series of transforming characteristic vector obtained by transforming the series of characteristic vector of the adaptive data #j by the transformation matrix $M_i$.

The above-mentioned allocation update processing in step S33 comprising processing in steps S41 to S48 ends, and the processing routine advances to step S34 whereupon the model adapting unit 12 determines whether or not the transformation matrix in which the allocated adaptive data is changed exists in the allocation update processing.

If it is determined in step S34 that the transformation matrix in which the allocated adaptive data is changed exists, the processing routine advances to step S35 whereupon the model adapting unit 12 sets, as the target transformation matrix, the transformation matrix in which the allocation of the adaptive data is changed. Then, the processing routine returns to step S32 whereupon the similar processing repeats.

In other words, when the transformation matrix in which the allocation of the adaptive data is changed exists, the transformation matrix is set as the target transformation matrix in step S35. Then, the processing routine returns to step S32 whereupon the target transformation matrix is updated by using the adaptive data which is allocated to the target transformation matrix. Further, in step S33, the allocation update processing is repeated.

When a plurality of transformation matrixes in which the allocation of the adaptive data is changed exist, in step S35, the plurality of transformation matrixes are set as the target transformation matrixes. In step S32, the plurality of target transformation matrixes are updated by using the adaptive data which is allocated to the target transformation matrixes.

On the other hand, if it is determined in step S34 that the transformation matrix in which the allocation of the adaptive data is changed does not exist, that is, if all the adaptive data in the adaptive database 11 is allocated to the best transformation matrix, the processing routine advances to step S36 whereupon the model adapting unit 12 performs the transformation matrix generation/deletion processing, and ends the transformation matrix update processing.

Figure 5:
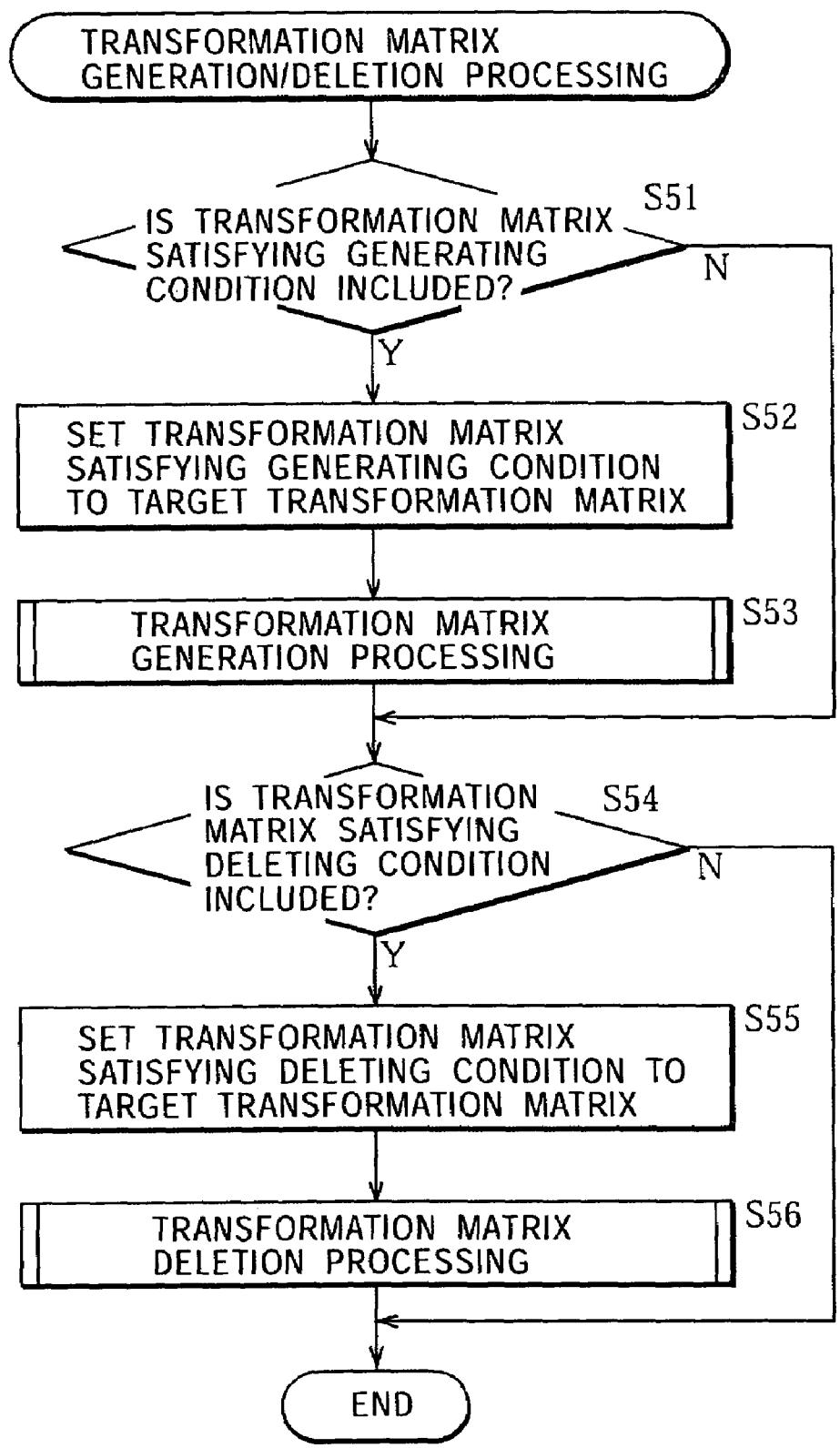
FIG. 5 is a flowchart for explaining transformation matrix generation/deletion processing.

Next, a description is given of the transformation matrix generation/deletion processing in step S36 in FIG. 4 with reference to a flowchart in FIG. 5.

In the transformation matrix generation/deletion processing, first, in step S51, the model adapting unit 12 determines whether or not the transformation matrixes stored in the transformation matrix storing unit 13 include the transformation matrix which satisfies a predetermined generating condition to be satisfied when generating the new transformation matrix.

Herein, as the generating condition, the number of the adaptive data more than a predetermined threshold (larger than a predetermined threshold) is allocated to the transformation matrix. Further, as the generating condition, the average of the error of the adaptive data allocated to the transformation matrix is not less than (larger than) the predetermined threshold, and there are a predetermined number of errors having not less than the predetermined threshold of the adaptive data allocated to the transformation matrix. That is, as the generating condition, the characteristic vector of all the adaptive data allocated to the transformation matrix is not transformed to the average vector with a corresponding relationship therewith with high accuracy, depending on the transformation matrix.

If it is determined in step S51 that the transformation matrixes stored in the transformation matrix storing unit 13 does not include the transformation matrix which satisfies the generating condition, the processing routine skips steps S52 and S53 and advances to step S54.

On the other hand, if it is determined in step S51 that the transformation matrixes stored in the transformation matrix storing unit 13 include the transformation matrix which satisfies the generating condition, the processing routine advances to step S52 whereupon the model adapting units 12 sets the transformation matrix satisfying the generating condition to the target transformation matrix. Then, the processing routine advances to step S53.

In step S53, the model adapting unit 12 performs transformation matrix generation processing which will be described later and then the processing routine advances to step S54.

In step S54, the model adapting unit 12 determines whether or not the transformation matrixes stored in the transformation matrix storing unit 13 include the transformation matrix which satisfies a predetermined deleting condition to be satisfied when deleting the transformation matrix.

Herein, as the deleting condition, for example, only the number of adaptive data not more than a predetermined threshold (less than the predetermined threshold) is allocated to the transformation matrix. Further, as the deleting condition, in addition to the allocation of only the number of adaptive data not more than the predetermined threshold to the transformation matrix, the average of errors of the adaptive data allocated to the transformation matrix is not less than (is larger than) the predetermined threshold. Furthermore, as the deleting condition, the latest date selected in step S6 in the speech recognition processing in FIG. 2 is stored for the transformation matrixes stored in the transformation matrix storing unit 13, and the date is a past one which passes not less than a predetermined number of dates from the current date. In this case, the deleted transformation matrix is the transformation matrix which is not selected for long time in step S6 in the speech recognition processing in FIG. 2.

As mentioned above, the deleting condition includes a status in which the adaptive data allocated to the transformation matrix does not exist and a status in which the transformation matrix is not used (is not selected) in the speech recognition.

If it is determined in step S54 that the transformation matrixes stored in the transformation matrix storing unit 13 do not include the transformation matrix which satisfies the deleting condition, the processing routine skips steps S55 and S56 and then the transformation matrix generation/deletion processing ends.

If it is determined in step S51 that the transformation matrixes stored in the transformation matrix storing unit 13 include the transformation matrix which satisfies the deleting condition, the processing routine advances to step S55 whereupon the model adapting unit 12 sets the transformation matrix which satisfies the deleting condition to the target transformation matrix and the processing routine advances to step S56.

In step S56, the model adapting unit 12 performs transformation matrix deletion processing, which will be described later, and the transformation matrix generation/deletion processing ends.

Figure 6:
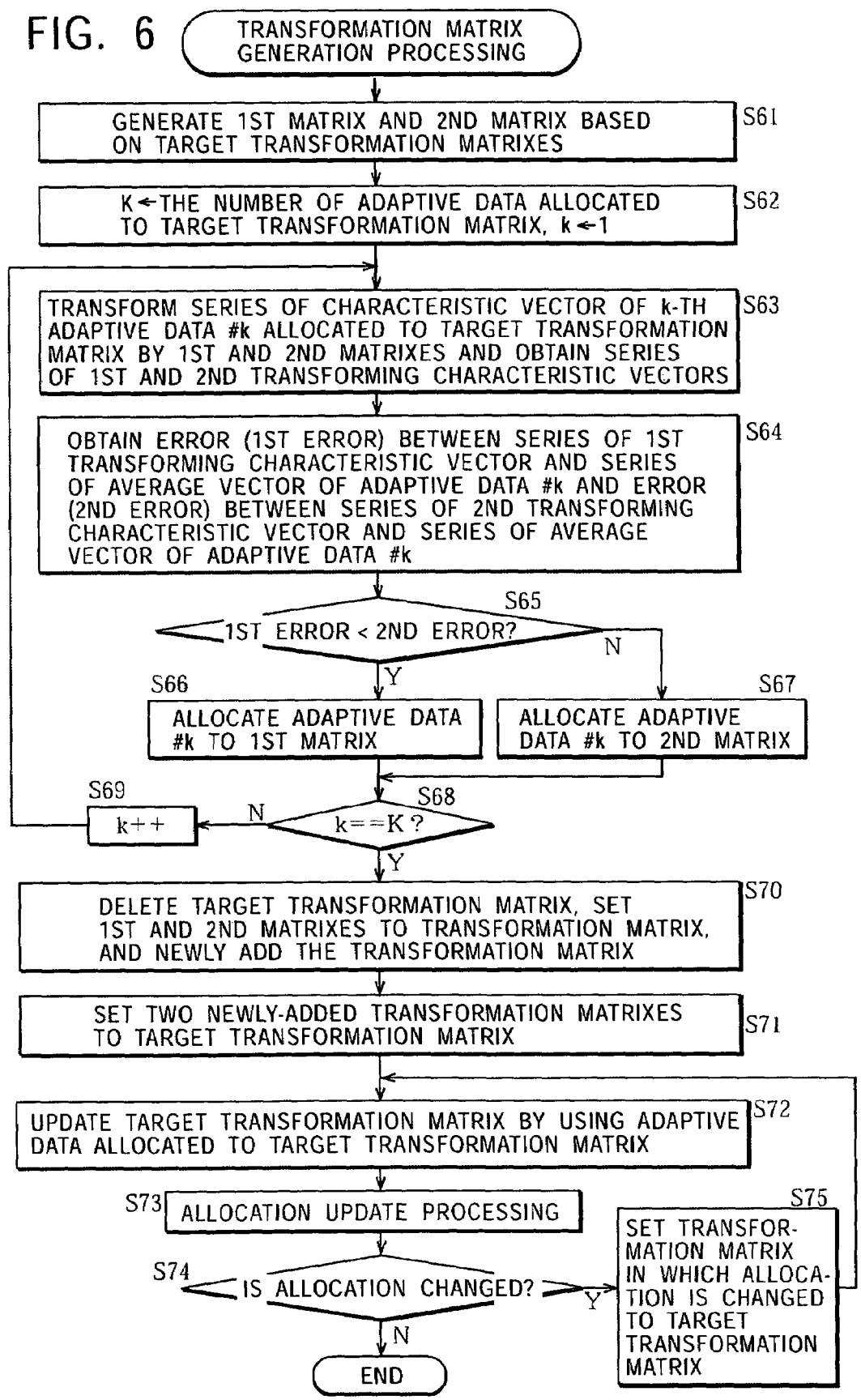
FIG. 6 is a flowchart for explaining transformation matrix generation processing.

Next, a description is given of the transformation matrix generation processing in step S53 in FIG. 5 with reference to a flowchart in FIG. 6.

In the transformation matrix generation processing, first, in step S61, the model adapting unit 61 generates first and second matrixes based on the target transformation matrix.

In other words, in this case, the transformation matrix which satisfies the generating condition is set to the target transformation matrix in step S52 in FIG. 5. In step S61, the target transformation matrix is split, thus to generate the two matrixes of the first and second ones.

Incidentally, in step S52 in FIG. 5, when the transformation matrixes include the plurality of target transformation matrixes, the transformation matrix generation processing in FIG. 6 is performed sequentially or in parallel for each of the plurality of target transformation matrixes.

Herein, the generation of the first and second matrixes based on the target transformation matrixes in step S61 changes the component by a predetermined value using the target transformation matrixes as a reference.

That is, by using the target transformation matrixes as the reference, the predetermined value is added or subtracted to the component, thus to obtain two matrixes for mapping predetermined vectors at positions shifting by predetermined minute vectors $\Delta$ and $-\Delta$ from positions obtained by mapping (transforming) the predetermined vectors by the target transformation matrixes. The two matrixes are set to the first and second matrixes. Further, the target transformation matrixes are set to the first matrix and a predetermined value is added or subtracted to the component using the target transformation matrix as a reference, thus to obtain the matrix for mapping the predetermined vector at the position shifting by the predetermined minute vector $\Delta$ from the position obtained by mapping the predetermined vector by the target transformation matrix. Then, the obtained matrix is set to the second matrix.

After the first and second matrixes are generated in step S61, in step S62, the model adapting unit 12 sets the number of adaptive data allocated to the target transformation matrix to a variable K, and initializes a variable k for counting the number of adaptive data to 1.

Then, the processing routine advances to step S63.

In step S63, the model adapting unit 12 transforms the series of characteristic vector of adaptive data #k as k-th adaptive data allocated to the target transformation matrix by the first and second matrixes, thereby obtaining two series of transforming characteristic vectors.

Herein, the series of transforming characteristic vectors obtained by transforming the series of characteristic vector by the first and second matrixes are referred to as first and second series of transforming characteristic vectors.

After that, in step S64, the model adapting unit 12 obtains an error between the first series of transforming characteristic vector and the series of average vector of the adaptive data #k (hereinafter, appropriately referred to as a first error) and an error between the second series of transforming characteristic vector and the series of average vector of the adaptive data #k (hereinafter, appropriately referred to as a second error), and the processing routine advances to step S65.

In step S65, the model adapting unit 12 determines whether or not the first error is less than (is not more than) the second error. If it is determined in step S65 that the first error is less than the second error, that is, if the first matrix is compared with the second matrix and then the first matrix more appropriately adapts the series of characteristic vector of the adaptive data #k to the acoustic as compared with the second matrix, the processing routine advances to step S66 whereupon the model adapting unit 12 allocates the adaptive data #k to the first matrix. Then, the processing routine advances to step S68.

If it is determined in step S65 that the first error is not less than the second error, that is, if the first matrix is compared with the second matrix and then the second matrix more appropriately adapts the series of characteristic vector of the adaptive data #k to the acoustic model, as compared with the first matrix, the processing routine advances to step S67 whereupon the model adapting unit 12 allocates the adaptive data #k to the second matrix. Then, the processing routine advances to step S68.

In step S68, the model adapting unit 12 determines whether or not the variable k is equal to the total number K of the adaptive data allocated to the target transformation matrix.

If it is determined in step S68 that the variable k is not equal to K, the processing routine advances to step S69 whereupon the morel adapting unit 12 increments the variable k by 1 and the processing routine returns to step S63 whereupon the above-mentioned processing repeats.

If it is determined in step S68 that the variable k is qual to K, that is, if the adaptive data allocated to the target transformation matrix is allocated to more adaptive one of the first and second matrixes (for transforming the characteristic vector to that more approximate to the corresponding average vector), the processing routine advances to step S70 whereupon the model adapting unit 12 deletes the target transformation matrix from the transformation matrix storing unit 13, sets the first and second matrixes as new transformation matrixes, and stores them in the transformation matrix storing unit 13.

In other words, the target transformation matrix is deleted and the two new transformation matrixes are added. In the transformation matrix storing unit 13, one transformation matrix is substantially added (generated).

Then, in step S71, the model adapting unit 12 sets the two new transformation matrixes to the target transformation matrix and the processing routine advances to step S72.

In step S72, similarly to the case in step S32 shown in FIG. 4, the model adapting unit 12 updates the target transformation matrix by using all the adaptive data allocated to the target transformation matrix.

In this case, the two transformation matrixes newly stored in the transformation matrix storing unit 13 are the target transformation matrixes. Therefore, the two target transformation matrixes are updated by using the adaptive data allocated thereto.

Then, in step S73, similarly to the case in step S33 in FIG. 4, the model adapting unit 12 performs the allocation update processing and the processing routine advances to step S74.

In step S74, the model adapting unit 12 determines whether or not the transformation matrix in which the allocated adaptive data is changed exists after the allocation update processing in step S73.

If it is determined in step S74 that the transformation matrix in which the allocated adaptive data is changed exists, the processing routine advances to step S75 whereupon the model adapting unit 12 sets to the new target transformation matrix, the transformation matrix in which the allocation of the adaptive data is changed. Then, the processing routine returns to step S72 whereupon the above-mentioned processing repeats.

In other words, if the transformation matrix in which the allocation of the adaptive data is changed exists, in step S75, the transformation matrix is set to the target transformation matrix. Then, the processing routine returns to step S72 whereupon the target transformation matrix is updated by using the adaptive data allocated thereto.

Further, in step S73, the allocation update processing repeats.

Incidentally, if a plurality of transformation matrixes in which the allocation of the adaptive data is changed exist, in step S75, the plurality of transformation matrixes are set to the target transformation matrixes. In step S72, the plurality of target transformation matrixes are updated by using the adaptive data allocated thereto.

On the other hand, if it is determined in step S74 that the transformation matrix in which the allocation of the adaptive data is changed does not exist, that is, if all the adaptive data in the adaptive database 11 is allocated to the best transformation matrixes, the transformation matrix generation processing ends.

Figure 7:
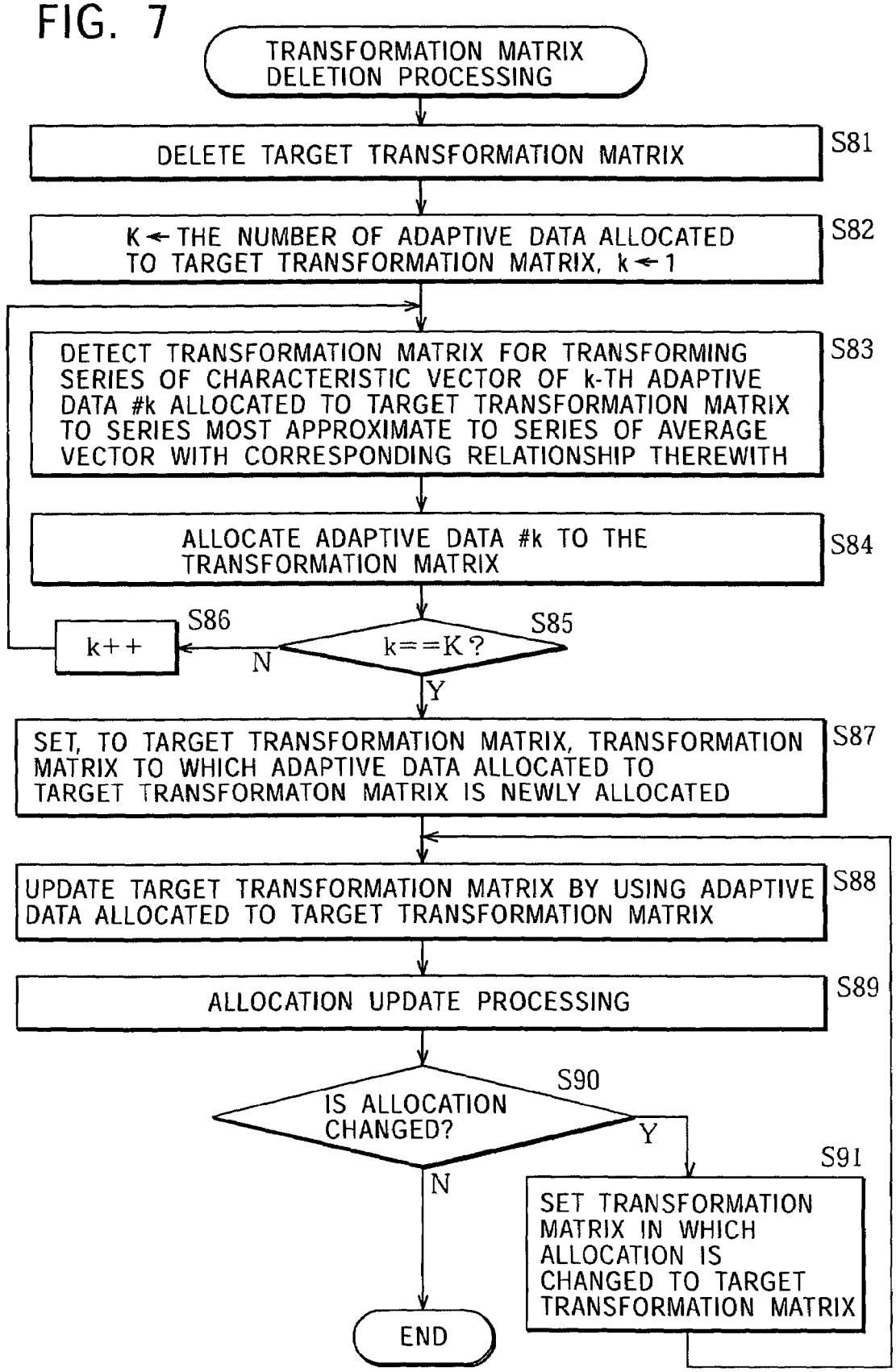
FIG. 7 is a flowchart for explaining transformation matrix deletion processing.

Next, a description is given of the transformation matrix deletion processing in step S56 shown in FIG. 5 with reference to a flowchart in FIG. 7.

In the transformation matrix deletion processing, first, in step S81, the model adapting unit 81 deletes the target transformation matrix from the transformation matrix storing unit 13.

In other words, in this case, in step S55 shown in FIG. 5, the transformation matrix which satisfies the deleting condition is set to the target transformation matrix. In step S81, the target transformation matrix is erased from the transformation matrix storing unit 13.

Incidentally, if a plurality of target transformation matrixes exist in step S55 shown in FIG. 5, in step S81 shown in FIG. 7, all the plurality of target transformation matrixes are deleted.

After deleting the target transformation matrix in step S81, the processing routine advances to step S82 whereupon the model adapting unit 12 sets to the variable K, the number of adaptive data allocated to the target transformation matrix, and initializes the variable k for counting the number of adaptive data to 1. Then, the processing routine advances to step S83.

Incidentally, if the plurality of target transformation matrixes are deleted in step S81, in step S82, the number of adaptive data allocated to the plurality of target transformation matrixes is set to the variable K.

In step S83, similarly to the case in step S24 in FIG. 3, the model adapting unit 12 detects from the transformation matrixes stored in the transformation matrix storing unit 13, the transformation matrix for transforming the series of characteristic vector of the adaptive data #k as the k-th adaptive data into the series of vector most approximate to the series of average vector corresponding to the series of characteristic vector, i.e., the best transformation matrix. Then, the processing routine advances to step S84.

In step S84, the model adapting unit 12 allocates (again) the adaptive data #k to the transformation matrix detected in step S83 (best transformation matrix) and the processing routine advances to step S85.

In step S85, the model adapting unit 12 determines whether or not the variable k is equal to the total number K of the adaptive data allocated to the target transformation matrix deleted in step S81.

If it is determined in step S85 that the variable k is not equal to K, the processing routine advances to step S86 whereupon the model adapting unit 12 increments the variable k by 1. Then, the processing routine returns to step S83 whereupon the above-mentioned processing repeats.

If it is determined n step 85 that the variable k is equal to K, that is, if all the adaptive data allocated to the target transformation matrix deleted in step S81 is allocated again to any of the transformation matrixes stored in the transformation matrix storing unit 13, the processing routine advances to step S87 whereupon the model adapting unit 12 sets to the new target transformation matrix, all the transformation matrixes to which any of the adaptive data allocated to the target transformation matrix is newly allocated. Then, the processing routine advances to step S88.

In step S88, similarly to the case in step S32 in FIG. 4, the model adapting unit 12 updates the target transformation matrix by using all the adaptive data allocated to the target transformation matrix.

Incidentally, if the plurality of transformation matrixes are the target transformation matrixes, in step S88, all the plurality of target transformation matrixes are updated by using the adaptive data allocated thereto.

Then, in step S89, similarly to the case in step S33 shown in FIG. 4, the model adapting unit 12 performs the allocation update processing, and the processing routine advances to step S90.

In step S90, the model adapting unit 12 determines whether or not the transformation matrix in which the allocated adaptive data is changed exists after the allocation update processing in step S89.

If it is determined in step S90 that the transformation matrix in which the allocated adaptive data is changed exists, the processing routine advances to step S91 whereupon model adapting unit 12 sets to the target transformation matrix, the transformation matrix in which the allocation of the adaptive data is changed, and the processing routine returns to step S88 whereupon the above-mentioned processing repeats.

In other words, when the transformation matrix in which the allocation of the adaptive data is changed exists, in step S91, the transformation matrix is set to the target transformation matrix. Then, the processing routine returns to step S88 whereupon the target transformation matrix is updated by using the adaptive data allocated thereto. Further, in step S89, the allocation update processing repeats.

Incidentally, if a plurality of transformation matrixes in which the allocation of the adaptive data is changed exist, the plurality of transformation matrix are set to the target transformation matrixes. In step S88, all the plurality of target transformation matrixes are updated by using the adaptive data allocated thereto.

On the other hand, if it is determined in step S90 that the transformation matrix in which the allocation of the adaptive data is changed does not exist, that is, if all the adaptive data in the adaptive database 11 is allocated to the best transformation matrixes, the transformation matrix deletion processing ends.

As mentioned above, in the speech recognition apparatus shown in FIG. 1, the user speaks and then, in the adaptive data registration processing shown in FIG. 3, the adaptive data including the characteristic vector of the user's speech is registered. Further, the adaptive data is allocated to the best transformation matrix in at least one transformation matrix stored in the transformation matrix storing unit 13. In the transformation matrix update processing shown in FIG. 4, the transformation matrix to which the new adaptive data is allocated is updated by using the adaptive data allocated thereto and further the adaptive data is allocated again to the transformation matrix so that the adaptive data stored in the adaptive database 11 is allocated to the best transformation matrix.

Therefore, the adaptive data is classified every best transformation matrix so that the series of characteristic vector for the adaptive data is adaptive to the corresponding acoustic model (clustering). Further, the transformation matrixes corresponding to the classes are updated by using the adaptive data of the classes which are classified as mentioned above. Thus, the user's input speech is automatically classified. The transformation matrix is updated so that the classified speech is made appropriately adaptive to the corresponding acoustic model. As a result, the speech is made adaptive to the model by using the above-obtained transformation matrix, thereby improving the accuracy for recognizing the speech.

The classification of the user's input speech is performed based on which transformation matrix is the best transformation matrix. Thus, the user does not need to designate his speech is classified to which class. This means that even the speech of the same user is classified to different class (is allocated to the different transformation matrix) if the environment or the like of the speech recognition apparatus is different. If the speech of the same user is classified to the different class, the transformation matrix corresponding to the class is the best transformation matrix for the speech classified into the different class. Thus, the speech can be adapted best to the corresponding to the acoustic model depending on the best transformation matrix.

Even the different user's speech is classified to the same class (is allocated to the same transformation matrix). However, if the different user's speech is classified to the same class, the transformation matrix corresponding to the class is the best transformation matrix for the speech which is classified to the same class. Therefore, the speech can be adapted best to the corresponding to the acoustic model by the best transformation matrix.

Further, in the transformation matrix generation processing shown in FIG. 6, the new transformation matrix is generated and the transformation matrix is updated by using the adaptive data having the transformation matrix as the best transformation matrix. Therefore, when using the speech recognition apparatus under the environment which is extremely different from the existing environments or when inputting the speech of the user who is extremely different from the existing users, the remarkable deterioration in accuracy for recognizing the speech is prevented.

That is, when using the speech recognition apparatus under the environment extremely different from the existing environments or when inputting the speech of the user who is extremely different from the existing users, the transformation matrix stored in the transformation matrix storing unit 13 cannot completely adapt the input speech to the corresponding acoustic model and the accuracy for recognizing the speech deteriorates. In the transformation matrix generation processing shown in FIG. 6, the new transformation matrix is generated and the new transformation matrix is updated by the speech inputted under the environment extremely different from the existing environments or by the speech of the user who is extremely different from the existing users. As a result, it is possible to prevent the deterioration in accuracy for recognizing the speech due to the change in user or environment, which is caused in the conventional model-adaptive speech recognition apparatus.

Further, in the transformation matrix generation processing shown in FIG. 6, when the number of adaptive data allocated to the transformation matrix is larger or when the average of the errors of the adaptive data is larger, the first and second matrixes for splitting the allocation of the adaptive data are generated as new transformation matrixes. Further, the adaptive data is allocated again to the transformation matrix for mapping (transforming) the series of characteristic vector of the adaptive data to the series more approximate to the corresponding series of the average vector. Therefore, the transformation matrix for adapting the speech to the more approximate acoustic model is dynamically generated while the user does not know it. Thus, the user does not need to recognize the adaptation to the acoustic model.

In the transformation matrix deletion processing shown in FIG. 7, when the number of adaptive data allocated to the transformation matrix is smaller, the transformation matrix is deleted. Therefore, it is possible to prevent the increase in processing amount due to the extremely increased number of transformation matrixes stored in the transformation matrix storing unit 13.

Further, in the speech recognition apparatus in FIG. 1, in the speech recognition processing shown in FIG. 2, the matching processing is performed by using the series of transforming characteristic vector obtained by transforming the series of characteristic vector for a predetermined time by using at least one transformation matrix stored in the transformation matrix storing unit 13. The matching processing is sequentially continued by transforming the series of characteristic vector by the transformation matrix by which the highest likelihood is obtained. Therefore, the input speech is transformed by the transformation matrix best to be adaptive to the corresponding acoustic model (according to the embodiment, by the transformation matrix for transforming the series of characteristic vector of the input speech to the series most approximate to the series of average vector for defining the Gaussian distribution of the series of the acoustic model corresponding to the speech). Therefore, if the speech recognition apparatus is used by a plurality of users or is used under a plurality of environments, the user's speeches or the speeches under the environments can promptly be adapted to the corresponding acoustic model. The speech is recognized with high accuracy without user's recognition of the adaptation to the acoustic model.

That is, in the conventional model-adaptive speech recognition apparatus, as mentioned above, after performing the adaptation to the model so as to adapt the acoustic model to the specific user or the specific environment, the use of the apparatus is started by another user or under another environment. Then, the acoustic model of the speech recognition apparatus is adaptive to the first user or the first environment. Therefore, the accuracy for recognizing the speech extremely deteriorates until the acoustic model is made adaptive to other users or other environments. However, in the speech recognition apparatus shown in FIG. 1, the speech is made adaptive to the corresponding acoustic model by transforming the input speech by the best transformation matrix. Thus, the acoustic model is promptly adaptive to other users or other environments.

Next, in the speech recognition apparatus shown in FIG. 1, (the characteristic vector of) the input speech is adaptive to the corresponding acoustic model. Further, in the speech recognition apparatus, as mentioned above, the acoustic model can be made adaptive to the input speech.

Figure 8:
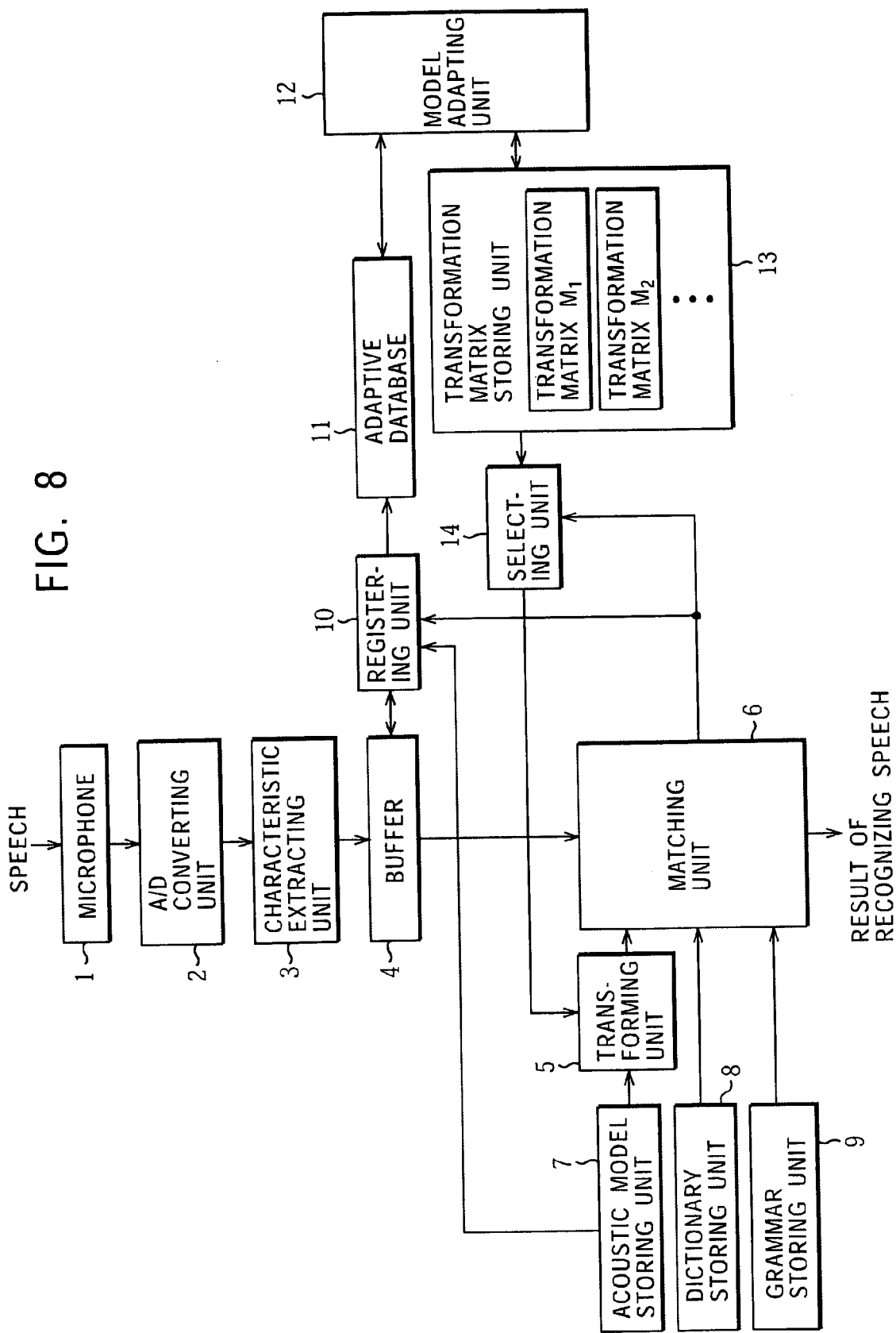
FIG. 8 is a block diagram showing an example of the structure of a speech recognition apparatus according to a second embodiment of the present invention.

Then, FIG. 8 shows an example of the structure of the speech recognition apparatus. Referring to FIG. 8, portions corresponding to the case shown in FIG. 1 are designated by the same reference numerals. Hereinbelow, a description thereof is appropriately omitted. That is, in the speech recognition apparatus shown in FIG. 8, the transforming unit 5 for transformation using the transformation matrix selected by the selecting unit 14 is not between the buffer 4 and the matching unit 6 but between the matching unit 6 and the acoustic model storing unit 7. Except for the above-mentioned structure, the speech recognition apparatus shown in FIG. 8 is basically the same as that shown in FIG. 1.

Consequently, in the speech recognition apparatus shown in FIG. 8, the transformation matrix transforms not the series of characteristic vector but (the series of average vector for defining the Gaussian distribution of) the acoustic model stored in the acoustic model storing unit 7. Thus, after obtaining the acoustic model adaptive to the input speech, the matching unit 6 performs the matching processing by using the obtained acoustic model.

Therefore, in the speech recognition apparatus shown in FIG. 8, the same advantages as those in that shown in FIG. 1 are obtained.

Incidentally, in the speech recognition apparatus shown in FIG. 8, the acoustic model is adaptive to the input speech. Thus, the transformation matrix for transforming the series of average vector of the adaptive data to the series most approximate to the series of characteristic vector of the adaptive data is obtained as the best transformation matrix. Simply, an inverse matrix of the transformation matrix used for the speech recognition apparatus shown in FIG. 1 is the transformation matrix used for the speech recognition apparatus shown in FIG. 8.

The above series of processing can be executed by hardware or software. Upon executing the series of processing on software, a program structuring the software is installed in a general computer or the like.

Figure 9:
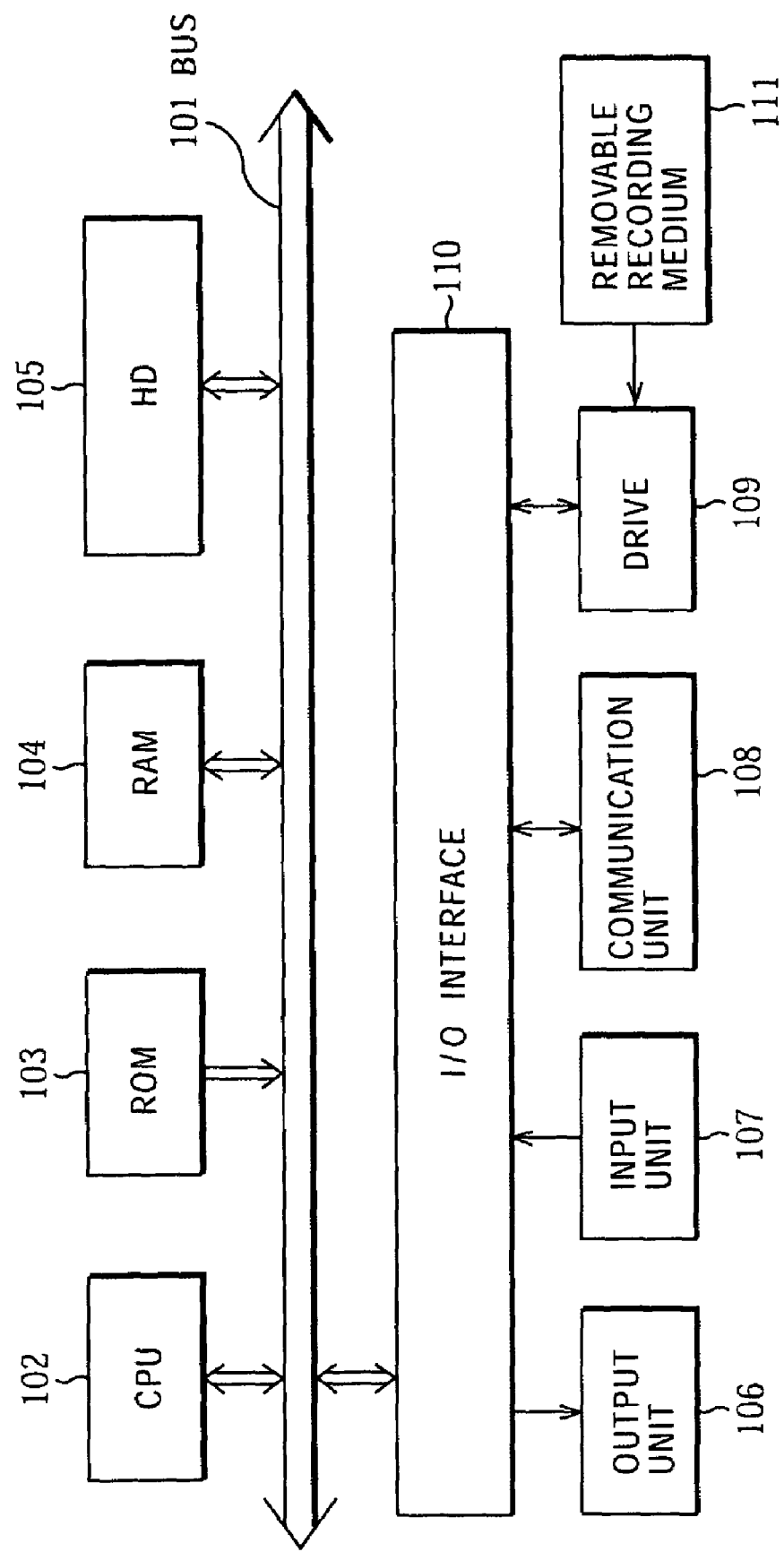
FIG. 9 is a block diagram showing an example of the structure of a computer according to a third embodiment of the present invention.

Then, FIG. 9 shows an example of the structure of the computer in which the program for executing the above series of processing is installed according to a third embodiment.

The program is previously recorded to a hard disk 105 or a ROM 103 as a recording medium incorporated in the computer.

Alternatively, the program is temporarily or permanently stored (recorded) in a removable recording medium 111 such as a flexible disk, a CD-ROM (Compact Disc Read Only Memory), an MO (Magneto optical) disk, a DVD (Digital Versatile Disc), a magnetic disk, or a semiconductor memory. The removable recording medium 111 is provided as so-called package software.

In addition to installing the program in the computer from the above-mentioned removable recording medium 111, the program is transformed by radio to the computer via a satellite for digital satellite broadcasting from a download site or the program is transformed by wiring to the computer via a network such as a LAN (Local Area Network) or the Internet. The computer receives the above-transferred program to a communication unit 108, and installs it to the incorporated hard disk 105.

The computer has a CPU (Central Processing Unit) 102. An input/output interface 110 is connected to the CPU 102 via a bus 101. The user inputs an instruction by operating an input unit 107 comprising a key board, a microphone, a mouse, and the like via the input/output interface 110 and the CPU 102 executes the program stored in the ROM (Read Only Memory) 103 in accordance with the instruction. Alternatively, the CPU 102 loads to a RAM (Random Access Memory) 104 and executes, the program received to the communication unit 108 and installed in the hard disk 105 or the program read from the removable recording medium 111 and installed in the hard disk 105. Thus, the CPU 102 executes the processing in accordance with the above-mentioned flowcharts or the processing under the above-mentioned structure shown in the block diagrams. The CPU 102 outputs the processing result from an output unit 106 comprising an LCD (Liquid Crystal Display), a speaker, and the like via the input/output interface 110 or transmits it from the communication unit 108, and further records it to the hard disk 105.

Herein, in the present specification, the processing step of describing the program which allows the computer to execute various processing is not necessarily performed in time series in the order described in the flowcharts. It includes processing which is executed in parallel or individually (processing based on parallel processing or an object).

Further, the program may be processed by the single computer or may distributedly be processed by a plurality of computers. Moreover, the program may be transferred to a remote computer and be executed.

According to the embodiment, the matrix (transformation matrix) is used for transformation for the adaptation to model. However, any desired function can be used.

In addition, according the embodiment, the linear transformation is performed as the transformation for the adaptation to model. However, non-linear transformation can be performed.

In addition, according to the embodiment, the HMM is used as the acoustic model and the matching processing is performed based on the HMM method, thus to obtain the score indicating the likelihood as the result of recognizing the speech. However, the algorithm for recognizing the speech is not limited to the HMM method.

In addition, according to the embodiment, the adaptive data includes the characteristic vector and is further stored in the adaptive database 11. However, the adaptive data can include waveform data of the speech, in place of the characteristic vector.

In addition, according to the embodiment, the transformation matrix update processing shown in FIG. 4 is executed after outputting the result of recognizing the input speech. However, this processing can be executed periodically or aperiodically at another arbitrary timing.

The transformation matrix generation/deletion processing shown in FIG. 5 is performed as a part of the transformation matrix update processing shown in FIG. 4 according to the embodiment. However, the transformation matrix generation/deletion processing can be periodically or aperiodically at another arbitrary timing.

Moreover, a description is not given of processing in the case of storing the adaptive data up to the upper limit of the storage capacity of the adaptive database 11 according to the embodiment. However, in this case, the storage of the adaptive data which is supplied later is prevented or old (past) adaptive data can be erased from the adaptive database 11. Further, a plurality of adaptive data having the approximate series of characteristic vector corresponding to the same series of average vector is searched. Then, the plurality of adaptive data may be collected as one piece of adaptive data comprising the same series of average vector and arbitrary one of the approximate plurality of characteristic vectors.

According to the embodiments of the present invention, the speech is recognized by the continuous HMM method. However, the speech is recognized by others, for example, a discrete HMM method.

Further, according to the embodiments of the present invention, in the transformation matrix generation processing shown in FIG. 6, the two matrixes of first and second ones are generated from the transformation matrixes for satisfying the generating condition. However, three or more matrixes can be generated.

INDUSTRIAL APPLICABILITY

According to the present invention, a best transformation function for adapting one of an input speech and an acoustic model corresponding thereto to the other is detected from at least one transformation function based on a transforming result of transforming the one of the input speech and the acoustic model by using at least one transformation function. The input speech is allocated to the best transformation function, and the transformation function to which the new input speech is allocated is updated by using all the input speeches allocated to the transformation function. Further, a transformation function used for transforming the one of the input speech and the acoustic model is selected from at least one transformation function. The selected transformation function transforms the one of the input speech and the acoustic model. The matching processing is performed so that one of the input speech and the acoustic model transformed by the transformation function matches the other. The result of recognizing the input speech is outputted based on the result of the matching processing. Therefore, if the speech recognition apparatus is used by a plurality of users or under a plurality of environments, the speech can be recognized with high accuracy without user's recognition of the adaptation to the acoustic model.

The invention claimed is:

1. A speech recognition apparatus for recognizing a speech, comprising:

transformation function storing means for storing at least one transformation function for transforming one of an input speech and an acoustic model used for recognizing the speech when transforming one of the input speech and the acoustic model and adapting the transformed one to the other;

allocating means for detecting the best transformation function to adapt the one of the input speech and the acoustic model corresponding to the input speech to the other from at least one transformation function stored in said transformation matrix storing means based on the transforming result of transforming the one of the input speech and the acoustic model by at least one transform function stored in said transform function storing means, and for allocating the input speech to the best transformation function;

speech storing means for storing the input speech to which the transformation function is allocated;

transformation function updating means for updating the transformation function to which a new input speech is allocated by said allocating means from at least one transformation function stored in said transform function storing means by using all the input speeches allocated to the transformation function;

transformation function selecting means for selecting the transformation function used for transforming one of the input speech and the acoustic model from at least one transformation function stored in said transform function storing means;

transforming means for transforming one of the input speech and the acoustic model by the transformation function selected by said transformation function selecting means; and matching means for performing matching processing in which the one of the input speech and the acoustic model transformed by the transformation function matches the other and for outputting the result of recognizing the input speech based on the matching processing result.

2. A speech recognition apparatus according to claim 1, wherein the acoustic model is HMM (Hidden Markov Model), and said matching means performs the matching processing based on the HMM method.

3. A speech recognition apparatus according to claim 2 wherein the HMM has Gaussian distribution for calculating the probability for observing the series of characteristic vector of a predetermined speech based on the HMM, and said allocating means transforms one of the series of characteristic vector of the input speech and the series of average vector for defining the Gaussian distribution of the HMM corresponding to the input speech, by at least one transformation function stored in said transformation function storing means, and detects, as the best transformation function, the transformation function for minimizing an error between the transformed one of the series of characteristic vector and the series of average vector and the other.

4. A speech recognition apparatus according to claim 2, wherein said transformation function update means updates the transformation function so as to, when transforming by the transformation function one of the series of characteristic vector of the input speech and the series of average vector for defining the Gaussian distribution of the HMM corresponding to the input speech for the input speech of at least one speech allocated to the transformation function, minimize a static error between the transformed one of the series of characteristic vector and the series of average vector and the other.

5. A speech recognition apparatus according to claim 4, wherein said transformation function update means obtains by a least square method, the transformation function so as to, when transforming by the transformation function the one of the series of characteristic vector of the input speech and the series of average vector for defining the Gaussian distribution of the HMM corresponding to the input speech for the input speech of at least one speech allocated to the transformation function, minimize a statistic error between the transformed one of the series of characteristic vector and the series of average vector and the other.

6. A speech recognition apparatus according to claim 1, wherein said transformation function update means updates the transformation function to which the new input speech is allocated, then, detects the best transformation function to adapt the one of the input speech and the acoustic model corresponding to the input speech to the other for all the input speeches stored in said speech storing means, from at least one transformation function stored in said transformation function storing means, and allocates again the input speech to the best transformation function.

7. A speech recognition apparatus according to claim 6, wherein said transformation function update means further updates the transformation function in which the allocation of the input speech is changed from at least one transformation function stored in said transformation function storing means and, thereafter, repeats to detect the best transformation function to adapt the one of the input speech and the acoustic model corresponding to the input speech to the other for all the input speeches stored in said speech storing means, from at least one transformation function stored in said transformation function storing means, and allocate again the input speech to the best transformation function, until the allocation of the input speech to the transformation function is not changed.

8. A speech recognition apparatus according to claim 1, further comprising:

transformation function generating means for generating a new transformation function based on the transformation function stored in said transformation function storing means.

9. A speech recognition apparatus according to claim 8, wherein said transformation function generating means generates the new transformation function based on the transformation function which satisfies a predetermined generating condition among at least one transformation function stored in said transformation function storing means.

10. A speech recognition apparatus according to claim 9, wherein said transformation function generating means sets the transformation function to which the input speeches of the number of speeches having a predetermined threshold are allocated as the transformation function which satisfies the predetermined generating condition, from at least one transformation function stored in said transformation function storing means, and generates the new transformation function based on the set transformation function.

11. A speech recognition apparatus according to claim 8, wherein said transformation function generating means obtains two first and second transformation functions by using one of the transformation functions stored in said transformation function storing means as a reference, detects the best transformation function to adapt the one of the input speech and the acoustic model corresponding to the input speech to the other for all the input speeches allocated to the one transformation function as the reference, from the first and second transformation functions, and allocates the input speech to the best transformation function, updates the first and second transformation functions by using the input speech allocated to the first and second transformation functions, and stores the first and second transformation functions after update, in place of the one transformation function as the reference, in said transformation function storing means.

12. A speech recognition apparatus according to claim 11, wherein said transformation function generating means stores the first and second transformation functions after update in said transformation matrix storing means, then detects the best transformation function to adapt the one of the input speech and the acoustic model corresponding to the input speech for all the input speeches stored in said speech storing means from at least one transformation function stored in said transformation function storing means, and allocates again the input speech to the best transformation function.

13. A speech recognition apparatus according to claim 12, wherein after allocating again the input speech to the transformation function, said transformation function generating means repeats to:

update the transformation function in which the allocation of the input speech is changed among at least one transformation function stored in said transformation function storing means; and detect the best transformation function to adapt the one of the input speech and the acoustic model corresponding to the input speech for all the input speeches stored in said speech storing means, from at least one transformation function stored in said transformation function storing means, and allocate again the input speech to the best transformation function, until the allocation of the input speech to the transformation function is not changed.

14. A speech recognition apparatus according to claim 1, further comprising:

transformation function deleting means for deleting the transformation function stored in said transformation function storing means.

15. A speech recognition apparatus according to claim 14, wherein said transformation function deleting means deletes the transformation function which satisfies a predetermined deleting condition among at least one transformation function stored in said transformation function storing means.

16. A speech recognition apparatus according to claim 15, wherein said transformation function deleting means deletes, as the transformation function which satisfies the predetermined deleting condition, the transformation function to which the input speeches corresponding to the number of speeches having not more than a predetermined threshold are allocated, among at least one transformation function stored in said transformation function storing means.

17. A speech recognition apparatus according to claim 14, wherein said transformation function deleting means deletes the transformation function from said transformation function storing means, detects the best transformation function to adapt the one of the input speech and the acoustic model corresponding to the input speech for all the input speeches allocated to the deleted transformation function to the other, from at least one transformation function remaining in said transformation function storing means, and allocates again the input speech to the best transformation function.

18. A speech recognition apparatus according to claim 17, wherein after allocating again the input speech to the transformation function, said transformation function deleting means repeats to:

update the transformation function in which the allocation of the input speech is changed, from at least one transformation function stored in said transformation function storing means; and detect the best transformation function to adapt the one of the input speech and the acoustic model corresponding to the input speech for all the input speeches stored in said speech storing means from at least one transformation function stored in said transformation function storing means, and allocate again the input speech to the best transformation function, until the allocation of the input speech to the transformation function is not changed.

19. A speech recognition apparatus according to claim 1, wherein said transformation function selecting means selects the transformation function from which the result of recognizing the speech having the highest likelihood is obtained, when performing the matching processing in which the transformed one of the input speech and the acoustic model matches the other by using at least one transformation function stored in said transformation function storing means.

20. A speech recognition method for recognizing an input speech, by using at least one transformation function for transforming one of the input speech and an acoustic model used for recognizing the speech when transforming the one of the input speech and the acoustic model to adapt the transformed one to the other, said method comprising:

an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function;

a speech storing step of storing the input speech to which the transformation function is allocated;

a transformation function updating step of updating the transformation function to which a new input speech is allocated in said allocating step from at least the one transformation function by using all the input speeches allocated to the transformation function;

a transformation function selecting step of selecting the transformation function used for transforming one of the input speech and the acoustic model from at least the one transformation function;

a transforming step of transforming one of the input speech and the acoustic model by the transformation function selected in said transformation function selecting step; and a matching step of performing matching processing in which the one of the input speech and the acoustic model transformed by the transformation function matches the other and for outputting the result of recognizing the input speech based on the matching processing result.

21. A program for allowing a computer to execute speech recognition processing for recognizing a input speech by using at least one transformation function for transforming one of the input speech and an acoustic model used for recognizing the speech when transforming the one of the input speech and the acoustic model to adapt the transformed one to the other, said program comprising:

an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function;

a speech storing step of storing the input speech to which the transformation function is allocated;

a transformation function updating step of updating the transformation function to which a new input speech is allocated in said allocating step from at least the one transformation function by using all the input speeches allocated to the transformation function;

a transformation function selecting step of selecting the transformation function used for transforming one of the input speech and the acoustic model from at least the one transformation function;

a transforming step of transforming one of the input speech and the acoustic model by the transformation function selected in said transformation function selecting step; and a matching step of performing matching processing in which the one of the input speech and the acoustic model transformed by the transformation function matches the other and of outputting the result of recognizing the input speech based on the matching processing result.

22. A recording medium for recording a program for allowing a computer to execute speech recognition processing for recognizing an input speech by using at least one transformation function for transforming one of the input speech and an acoustic model used for recognizing the speech when transforming the one of the input speech and the acoustic model to adapt the transformed one to the other, wherein said program comprises:

an allocating step of detecting the best transformation function to adapt one of the input speech and the acoustic model corresponding to the input speech to the other from at least one transformation function based on the transforming result of transforming the one of the input speech and the acoustic model from at least the one transformation function, and of allocating the input speech to the best transformation function;

a speech storing step of storing the input speech to which the transformation function is allocated;

a transformation function updating step of updating the transformation function to which a new input speech is allocated in said allocating step from at least the one transformation function by using all the input speeches allocated to the transformation function;

a transformation function selecting step of selecting the transformation function used for transforming one of the input speech and the acoustic model from at least the one transformation function;

a transforming step of transforming one of the input speech and the acoustic model by the transformation function selected in said transformation function selecting step; and a matching step of performing matching processing in which the one of the input speech and the acoustic model transformed by the transformation function matches the other and of outputting the result of recognizing the input speech based on the matching processing result.

* * * * *